(12) United States Patent
Kanatsu

(10) Patent No.: US 8,050,499 B2
(45) Date of Patent: Nov. 1, 2011

(54) IMAGE-PROCESSING APPARATUS, IMAGE-PROCESSING METHOD, AND COMPUTER PROGRAM USED THEREWITH

(75) Inventor: Tomotoshi Kanatsu, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1220 days.

(21) Appl. No.: 11/692,127

(22) Filed: Mar. 27, 2007

(65) Prior Publication Data

US 2007/0230810 A1    Oct. 4, 2007

(30) Foreign Application Priority Data

Mar. 31, 2006    (JP) .................... 2006-098003

(51) Int. Cl.
*G06K 9/34*    (2006.01)
(52) U.S. Cl. ................................ 382/173; 382/176
(58) Field of Classification Search ................ 382/173, 382/176, 177, 197, 198, 203
See application file for complete search history.

(56) References Cited

U.S. PATENT DOCUMENTS

| | | | |
|---|---|---|---|
| 5,353,393 A * | 10/1994 | Bennett et al. | 345/641 |
| 5,680,478 A | 10/1997 | Wang et al. | |
| 5,680,479 A | 10/1997 | Wang et al. | |
| 5,966,135 A * | 10/1999 | Roy et al. | 345/619 |
| 2003/0072487 A1 * | 4/2003 | Fan et al. | 382/176 |
| 2004/0223197 A1 | 11/2004 | Ohta et al. | |
| 2004/0227758 A1 * | 11/2004 | Curry et al. | 345/426 |
| 2005/0238244 A1 | 10/2005 | Uzawa | |
| 2006/0045386 A1 | 3/2006 | Fukuoka et al. | |
| 2006/0274381 A1 | 12/2006 | Simard et al. | |
| 2007/0013951 A1 | 1/2007 | Burgess et al. | |

FOREIGN PATENT DOCUMENTS

| | | |
|---|---|---|
| CN | 1455332 A | 11/2003 |
| CN | 1458628 A | 11/2003 |
| JP | 04-157578 A | 5/1992 |
| JP | 06-068301 A | 3/1994 |
| JP | 2000-306103 A | 11/2000 |
| JP | 2004-265384 A | 9/2004 |
| JP | 2005-346137 A | 12/2005 |

* cited by examiner

*Primary Examiner* — Phuoc Tran
(74) *Attorney, Agent, or Firm* — Canon U.S.A. Inc., I.P. Division

(57) ABSTRACT

The present invention is intended to generate data optimal for both display and reuse from an image. From an input image, vector data of a display foreground layer, vector data of a non-display foreground layer, and a display background layer in which a portion of the input image is filled are generated. Next, electronic data including the display foreground layer, display background layer, and the non-display foreground layer is generated. By using the multi-layered electronic data, a composite image of the display foreground layer and the display background layer is provided for display, and the layers for display are switched for reuse. This makes it possible to provide data optimal for both display and reuse.

33 Claims, 23 Drawing Sheets

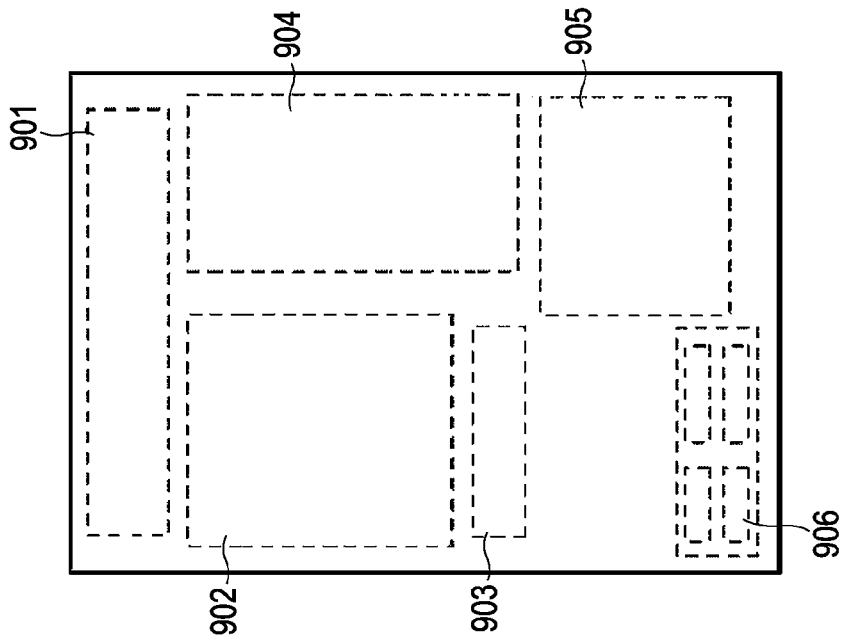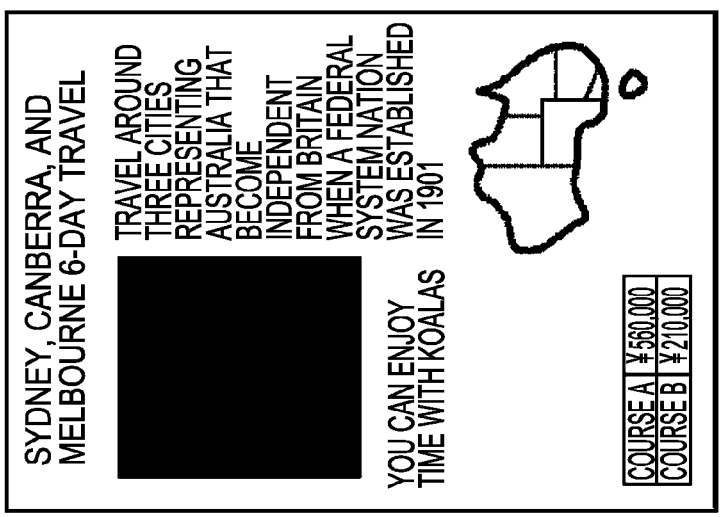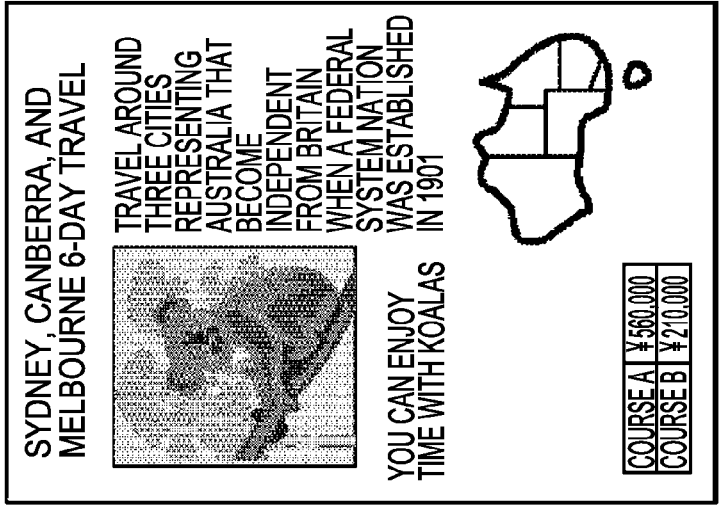

FIG. 10

```
<graphic>

<path d="...... "/>            ⎫
  <path d="....... "/>           ⎬ —1001
      :                          ⎭

<image src="data:image/jpeg:base64,   ⎫
  /9j/4AAQSkZJRgABAQEABgAGAAD/2wBDAAgG  ⎪
  BgcGBQqHBwcJCQqKDBQNDAsLDBkSEw8UHRof ⎬ —1002
  HhOaHB ..... "/>                      ⎭

<path d= "....... "/>          ⎫
  <path d= "..... "/>            ⎬ —1003
      :                          ⎭

</graphic>
```

FIG. 26

```
<graphic>

<text display="false">ABC</text>
      :
  <shape display="false">
   <star vertex="5" ... />
      :
  </shape>
      :                                    }—2600

<path d="...... "/>
  <path d="....... "/>                     }—2601
      :

<image src="data:image/jpeg:base64,
  /9j/4AAQSkZJRgABAQEABgAGAAD/2wBDAAgG
  BgcGBQqHBwcJCQqKDBQNDAsLDBkSEw8UHRof   }—2602
  HhOaHB ..... "/>

<path d= "........"/>
  <path d= "....."/>                       }—2603
      :

</graphic>
```

FIG. 29
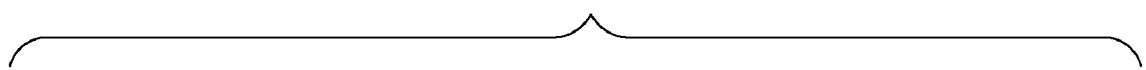
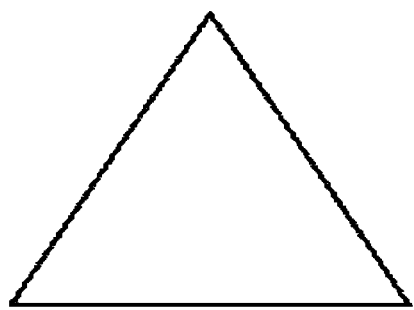
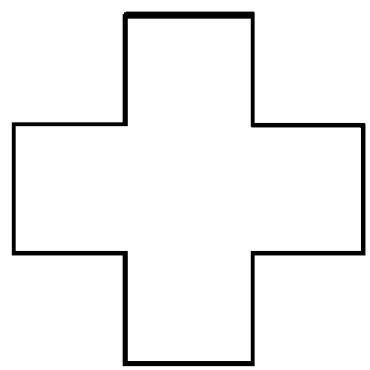
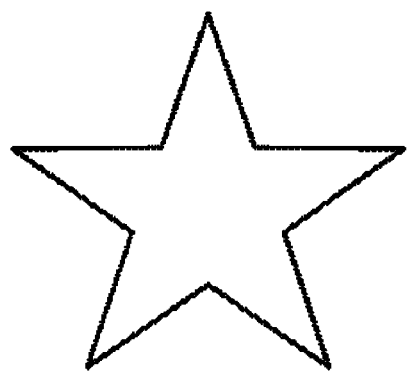
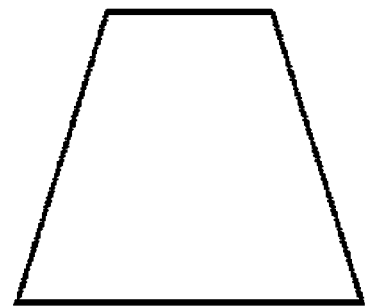

IMAGE-PROCESSING APPARATUS, IMAGE-PROCESSING METHOD, AND COMPUTER PROGRAM USED THEREWITH

BACKGROUND OF THE INVENTION

1. Field of the Invention

The present invention relates to a technology for converting a document image into electronically reusable data.

2. Description of the Related Art

In recent years, in document creation, not only simply entering characters, but also advanced functions, such as decorating a font, freely drawing pictures, and capturing photographs, have become used.

However, the higher the content of a document is, the larger the required effort is in order to create the document from the beginning. Accordingly, it is preferable to directly reuse a part of a previously created document or an altered and edited document as much as possible.

In addition, with widespread use of networks typified by the Internet, opportunities in which documents are electronically distributed have increased. However, electronic documents are often distributed in a form printed on paper.

Accordingly, even if there is only a paper document at hand as described above, a technology for obtaining content as reusable data from a paper document has been proposed. For example, Japanese Patent Laid-Open No. 2004-265384 discloses that, when an apparatus electronically reads a paper document, a document that matches the content of the read document is acquired by searching a database, and the acquired document can be used instead of read document data. In addition, if an identical document cannot be specified in the database, an image of the read document is converted into easily reusable electronic data. Thus, also in this case, the document content can be reused.

There have been vectorization technologies (technologies for conversion into vector data) as technologies for converting document images into easily reusable data. For example, Japanese Patent No. 3026592 and Japanese Patent Laid-Open No. 2005-346137 disclose technologies for obtaining outlines of connected pixels in binary images as function descriptions. By using these technologies, character and figure outlines in document images can be converted into vector data. By using the vector data in software such as a document creating application, character positions and sizes can easily be changed in units of characters, and, in addition, geometric shape changing, coloring, etc., can easily be performed.

In addition, a region-recognition technique for recognizing regions such as character regions, line-drawing regions, and natural images and tables in a document image is disclosed in Japanese Patent Laid-Open No. 06-068301, etc.

By using the vectorization technology to convert a paper document into easily reusable vector-description electronic data, the electronic data can be stored and used more efficiently compared with the case of storing the paper document.

However, when a document image is converted into data suitable for reuse, appearance of the data in display may differ from appearance of the original data. Accordingly, when the data is displayed on a screen or is printed, there is a possibility that information equivalent to that of the original image may not be obtained.

For example, Japanese Patent Laid-Open No. 2004-265384 describes that, when an inner outline and outer line of a line drawing portion are close to each other, an average distance is found and the line drawing is represented as a vector by a line having the average distance as a line width.

However, the use of the average distance as the line width may cause an outstanding difference from an original image.

When an image is vectorized by the vectorization technique disclosed in Japanese Patent No. 3026592 or Japanese Patent Laid-Open No. 2005-346137, if connected pixels have a single color, the pixels can be reproduced by representing one color in the vector description. However, when the periphery and interior of the connected pixels have different colors, gradation, or random colors, it may be difficult to extract the colors and it may be difficult to describe the vector.

As described above, limitation in information extraction and limitation in vector description exist. Thus, when an original image is converted into vector descriptions focusing on reusability, there is a possibility that appearance equality important to display and printing may not be obtained.

In addition, when a character image is converted into character codes by using a character-recognition technology, appearance equality cannot be obtained unless converted data includes font information identical to that in an input image. Specifically, when the character image is reproduced by using the character codes and the font, there is a possibility that a reproduction apparatus has no font information identical to that in the input character image. Thus, there is a possibility that appearance equality may not be obtained. In addition, in the character-recognition technology, recognition errors occur due to an effect of noise at a scanning time and an effect of an unknown font that has not been learned in a recognition dictionary.

SUMMARY OF THE INVENTION

To solve the above-described problems, an image-processing apparatus according to an aspect of the present invention includes a vectorization unit configured to convert foreground images included in an input image into vector data, and a generating unit configured to generate multi-layered electronic data including a first layer including vector data of a first foreground image in the input image, a second layer including a background image in the input image, and a third layer including vector data of a second foreground image in the input image.

An image-processing method according to another aspect of the present invention includes converting foreground images included in an input image into vector data, and generating multi-layer electronic data including a first layer including vector data of a first foreground image in the input image, a second layer including a background image in the input image, and a third layer including vector data of a second foreground image in the input image.

According to the present invention, when an image is converted into vector data suitable for reuse, the vector data can be generated as data suitable for display and reuse.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A, 9B, and 9C are illustrations of an example of region recognition.

FIG. 10 is an illustration of an output data description.

FIG. 26 is an illustration of an example of output data description.

FIG. 29 is an illustration including a triangle, a cross, a star, and a trapezoid that are recognized figures.

DESCRIPTION OF THE EMBODIMENTS

First Embodiment

Figure 1:
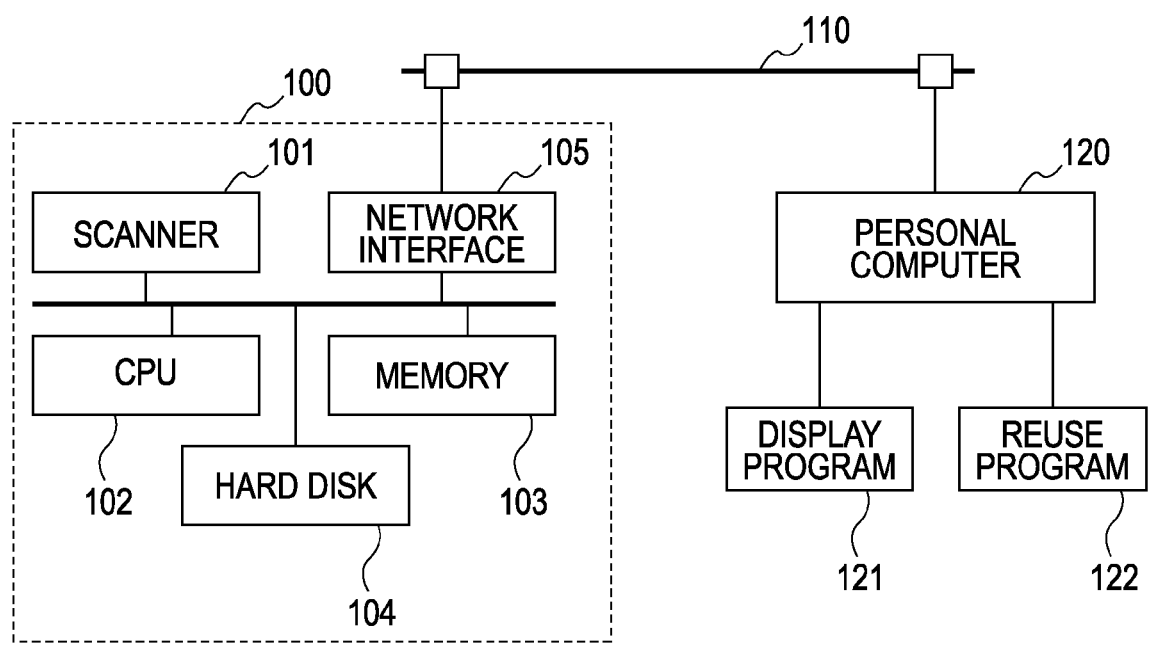
FIG. 1 is a block diagram showing the configurations of first to third embodiments of the present invention.

FIG. 1 is a block diagram showing an example of the configuration of a system in which a first embodiment of the present invention is used. This system includes an image-processing apparatus 100. The image-processing apparatus 100 includes a scanner 101 for converting sheet information of a read document into image data, a CPU (central processing unit) 102 for executing an electronic-data generating program for implementing processing according to an embodiment of the present invention on the image data, a memory 103 used for purposes such as a work memory used when the program is executed, and temporarily storing data, a hard disk 104 for storing the program and data, and a network interface 105 for inputting/outputting data to/from an external apparatus (not shown). A personal computer 120 is connected to the image-processing apparatus 100 by a network such as a LAN (local area network) 110. The personal computer 120 can display received data on its screen by using a display program 121, and can control a different editing application to use partial data of the received data by using a reuse program 122.

Figure 2:
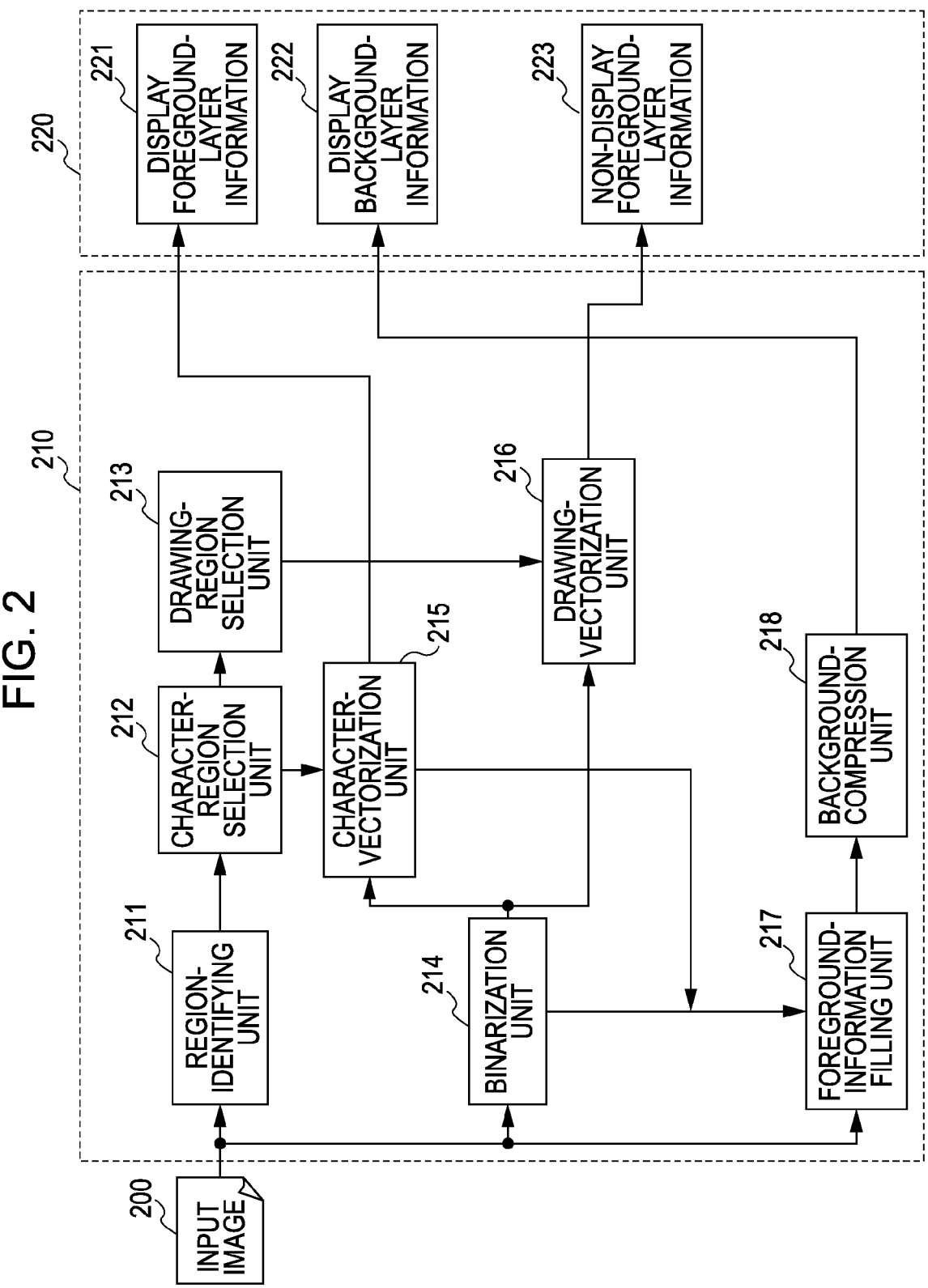
FIG. 2 is a block diagram illustrating an operation of the first embodiment.

FIG. 2 illustrates an operation of the first embodiment. An electronic-data generator 210 receives an image 200 input from the scanner 101, and generates electronic data from the input image 200. The configuration of electronic data generated by the electronic-data generator 210 is represented by reference numeral 220. In the first embodiment, each of processes that is performed by the electronic-data generator 210 is realized such that the CPU 102 executes the electronic-data generating program. However, all or part of the process may be configured by an electric circuit.

Blocks, represented by reference numerals 211 to 218, are schematic representations of the processes executed by the electronic-data generator 210. A region-identifying unit 211 identifies regions, such as a character, a natural image, and a line drawing, from the input image of a document, and outputs identified regions as region information. A character-region selection unit 212 selects character information from the region information output by the region-identifying unit 211. A drawing-region selection unit 213 selects line-drawing region information from the region information output by the region-identifying unit 211. A binarization unit 214 converts an input multiple-valued color or gray image into a monochrome binary image. A character-vectorization unit 215 extracts and converts outline information of each character from a binary image of the character region into a vector drawing function. A drawing-vectorization unit 216 extracts and converts line-element information of a line drawing from a binary image in the line-drawing region into a vector drawing function. A foreground-information-filling unit 217 generates an image having a filled character portion by filling pixel information (character information) corresponding to a foreground in the character region with a color identical to the color of a pixel in the vicinity of each character portion. A background-compression unit 218 performs compression (for example, JPEG compression), by using a multiple-valued image (character-portion-filled image) with foreground information filled as a background.

The electronic data 220 generated by the electronic-data generator 210 has a layered structure including data element information 221 to data element information 223 as follows. Display foreground-layer information 221 is, in the generated electronic data, information forming a display foreground-layer, and is, in the first embodiment, a description of a group of the vector drawing functions generated by the character-vectorization unit 215. Display background-layer information 222 is, in the generated electronic data, information forming a display background layer, and is, in the first embodiment, a description of compressed background image data generated by the background-compression unit 218. Non-display foreground-layer information 223 is, in the generated electronic data, information forming a non-display foreground layer, and is, in the first embodiment, a description of the vector drawing functions generated by the drawing-vectorization unit 216.

The operation of the first embodiment is described below with reference to the flowchart shown in FIG. 3.

In step S301, multiple-valued image data of the document scanned by the scanner 101 is input. The image data is based on a 24-bit RGB color format. The image data may have a 16-bit color format, a YCbCr format, or an 8-bit gray format. In step S301, it is assumed that the document shown in FIG. 4 has been input. It is also assumed that the document has thereon black character groups 401 and 402, a black drawing 403, and a natural image 404. It is also assumed that a gray background 405 is drawn on the base of the document.

Figure 5:
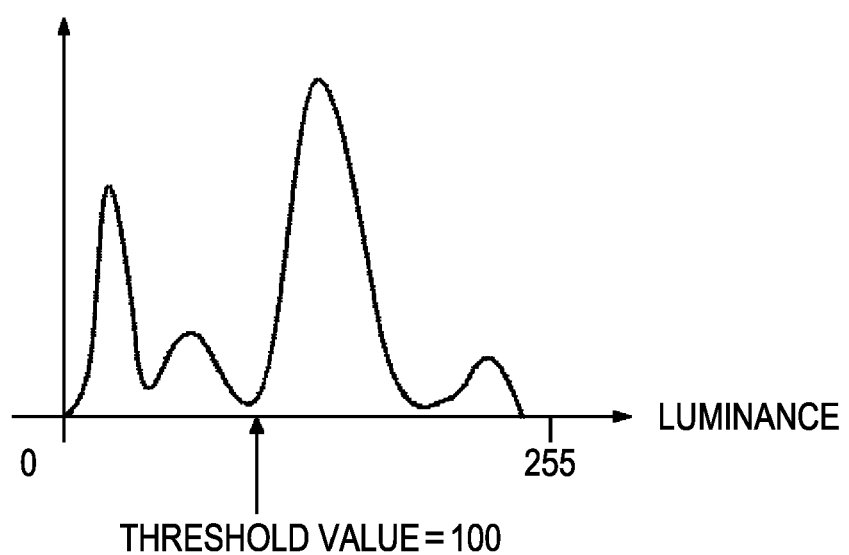
FIG. 5 is a graph showing an example of threshold value extraction during binarization.
Figure 6:
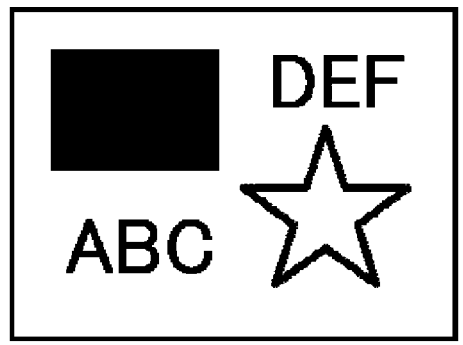
FIG. 6 is an illustration of the result of binarization.

In step S302, the binarization unit 214 binarizes the input multiple-valued image by using a known binarization technique to generate a monochrome binary image. Binarization is performed so that pixels corresponding to the foreground, such as the character groups, line drawing, and natural image in the document, are displayed black, and the other pixels corresponding to the background are displayed white. As this type of binarization, there is, for example, a binarization method for acquiring a luminance histogram of a multiple-valued image and using a threshold value adaptively obtained from peaks of the histogram. For example, when the luminance histogram shown in FIG. 5 is created from the multiple-valued image, by regarding the highest peak in luminance as a set of pixels of a background base, and selecting a luminance value at the bottom as a threshold value, the binarization results shown in FIG. 6 can be obtained.

Figure 7:
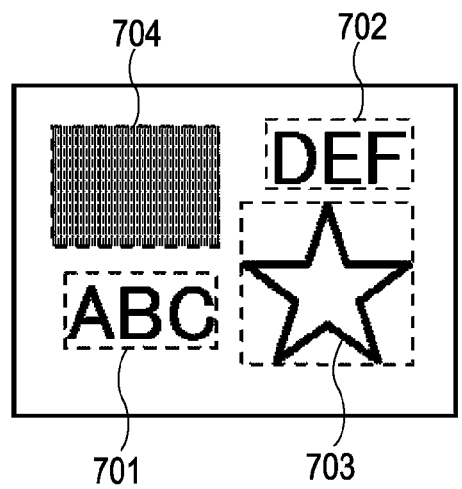
FIG. 7 is an illustration of the result of region recognition.

In step S303, the region-identifying unit 211 uses a known region-recognition technique to identify regions such as a character group, a line drawing, and a natural image, and generates region information. The region information includes coordinate information specifying four sides of the region in an image, and attribute information representing a region type. For example, from the input image shown in FIG. 4, information of the four regions 701 to 704 shown in FIG. 7 is generated. Specifically, the regions 701 and 702 are character regions, the region 703 is a line-drawing region, and the region 704 is a natural-image region.

Region-identifying techniques include a technique for directly analyzing an input multiple-valued image, a technique for performing a region analysis based on a binary image obtained by binarizing a multiple-valued image, and a technique for performing a region analysis by generating differential edge information or the like from a multiple-valued image.

For example, by using the binary image generated in step S302, region identifying can be performed. According to the region-identifying process described in Japanese Patent Laid-Open No. 06-068301, image data can be divided into regions classified on the basis of document and shape characteristics such as a character, a line drawing, a natural image such as a photograph, and a table.

First, by tracing an outline of connected eight black pixels for a binary image, clusters of black pixels are extracted. For each cluster of black pixels that has a large area, by tracing an outline of connected four white-pixels from the interior of the cluster, clusters of white pixels are extracted. In addition, by performing the black-pixel-outline tracing again from the interior of each cluster of white pixels having a predetermined area or greater, clusters of black pixels are extracted.

Next, the obtained clusters of black pixels are classified by size, shape, density, etc., and are grouped, if necessary, before being classified into different attribute regions such as characters, drawings, photographs, lines, and tables. For example, a cluster of pixels in which the aspect ratio is close to one and in which the size is in a predetermined range is regarded as a cluster of pixels corresponding to a character. Portions in which clusters of pixels corresponding to characters are close to one another and which can be grouped with good alignment are determined as character regions. Among clusters of black pixels excluding them, a cluster of pixels that has at least a flatness level is alone determined as a line region, and a range occupied by clusters of black pixels including highly aligned quadrangular white-pixel clusters each having at least a predetermined size is determined as a frame and table region. Among the other clusters of pixels that are amorphous, each cluster of pixels having a low black-pixel density is determined as a line-drawing region, and each region formed by grouping portions in which other clusters of pixels and smaller clusters of pixels are scattered is determined as a natural-image region.

FIG. 9A shows a multiple-valued image. FIG. 9B shows a binary image generated from the multiple-valued image in FIG. 9A. FIG. 9C shows examples of results obtained by performing region-identifying on the binary image in FIG. 9B by using the region-identifying process described in Japanese Patent Laid-Open No. 06-068301. Among the results of region identifying shown in FIG. 9C, regions 901, 903, and 904 are identified as character regions, a region 905 is identified as a line-drawing region, and a region 906 is identified as a table region.

In steps S304 to S309, each extracted region corresponding to each type of information is sequentially treated as a region of interest.

In step S304, the character-region selection unit 212 determines whether the region of interest is a character region. The region information generated in step S303 includes its type as an attribute. Accordingly, in step S304, the character-region selection unit 212 only needs to determine whether the attribute represents a character. If the attribute represents the character, the process proceeds to step S305. If the attribute does not represent the character, the process proceeds to step S307.

In step S305, the character-vectorization unit 215 uses a known binary image vectorization technology to generate character vector information for characters in the region of interest. Examples of the binary image vectorization technology include Japanese Patent No. 3026592 and the method disclosed in Japanese Patent Laid-Open No. 2005-346137.

According to the technology disclosed in Japanese Patent No. 3026592, on the basis of the states of a pixel of interest and neighborhood pixels around it, horizontal and vertical interpixel vectors are detected, while performing raster scanning a binary image. Next, by extracting an outline of image on the basis of a connecting state of two interpixel vectors, information that uses sets of interpixel vectors to describe the periphery of connected pixel data, called the "outline vector", is generated. According to the technology disclosed in Japanese Patent Laid-Open No. 2005-346137, by approximating an outline vector with a straight line or a quadratic or cubic Bezier curve, vector description data that enables high image quality even if the image size is greatly changed is generated.

Characters subject to vectorization exist as sets of connected black pixels in the binary image. Thus, by using the technology disclosed in Japanese Patent No. 3026592, from each character, an outline vector that is a set of vectors between pixels forming the outline is extracted. In addition, by using the technology disclosed in Japanese Patent Laid-Open No. 2005-346137, the extracted outline vector is converted into a vector description represented by a set of straight line and curve functions. In order to handle a case in which characters in the input multiple-valued image have a color different from black, it is preferable to perform acquiring colors of pixel groups corresponding to connected pixels from a multiple-valued image and adding the colors as rendering color information to a vector description.

Figure 4:
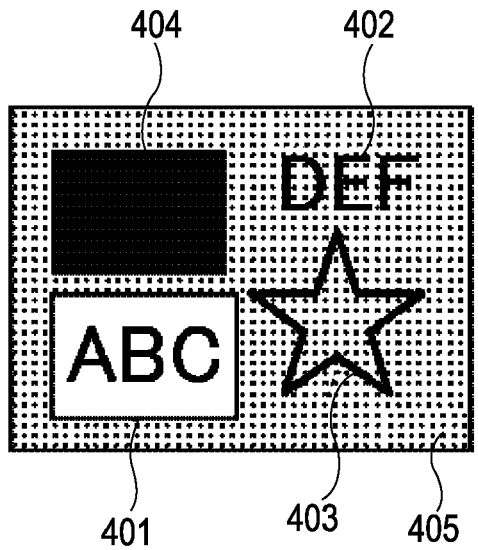
FIG. 4 is an illustration of an input image.
Figure 8:
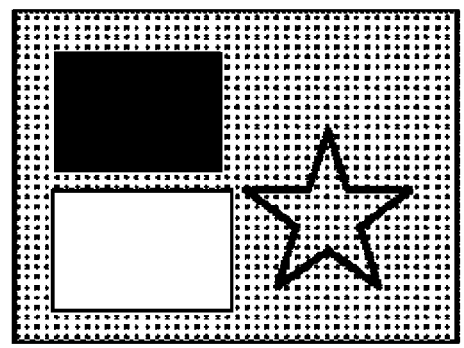
FIG. 8 is an illustration of an example of a background image.

In step S306, the foreground-information-filling unit 217 changes pixels corresponding to the foreground (character portions) in the region of interest on the multiple-valued image to have a color identical to a color of peripheral pixels. For example, the result of performing foreground filling on the character regions in FIG. 4 is shown in FIG. 8.

For example, the filling may be performed as follows. An area in the region of interest on the multiple-valued image is divided into N by M pixel blocks, where N and M represent arbitrary integers. Here, for example, N=M=16. Next, in each block, the average of pixel values of pixels other than pixels in the foreground is calculated. In this context, the pixels in the foreground are pixels identical in position to the black pixels on the binary image generated in step S302. Thus, by acquiring pixel values of pixels in the multiple-valued image that correspond to white pixels in the region of interest in the binary image, the average is calculated. After that, the pixels on the multiple-valued image that correspond to the black pixels in the block of interest on the binary image in the block are filled with pixel values equal to the average.

By performing the above-described processing on the blocks on the input multiple-valued image, a multiple-valued image in a state in which foreground information in the character regions are removed can be generated. If, in a block, the average of pixel values other than the pixel values in the foreground is not sufficiently obtained, an already obtained average in an adjacent block may be used. When a boundary between the characters and the background on the multiple-valued image is not sharp due to causes such as blurring at a scanning time, by enlarging the block pixels on the binary image before performing the above-described processing, the processed region can be formed as a flatter background plane.

In step S307, the drawing-region selection unit 213 determines whether the region of interest is a line-drawing region. If the region of interest is the line-drawing region, the process proceeds to step S308. If the region of interest is not the line-drawing region, the process proceeds to step S309.

In step S308, the drawing-vectorization unit 216 generates line-drawing vector information of the interior of the region of interest. For example, as described in Japanese Patent Laid-Open No. 2004-265384, the drawing-vectorization unit 216 can perform vectorization based on an outline of a line-drawing portion. In the first embodiment, regarding vector data obtained from the drawing portion, adjacent outlines (for example, an outer outline and an inner outline) are combined into one, whereby the vector data is converted into vector data (thinning vector data) representing a centerline of the line drawing. Here, the drawing is divided into line elements in units of endpoints and intersections, and vector data representing the centerline of each line element is used for representation.

Figure 16A:
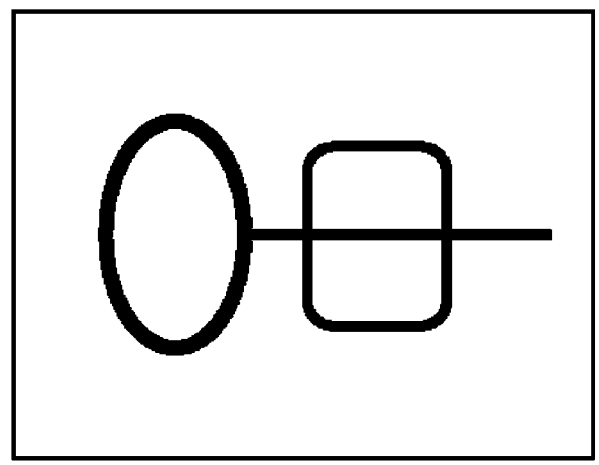
FIGS. 16A, 16B, and 16c are illustrations of line drawing vectorization.
Figure 16B:
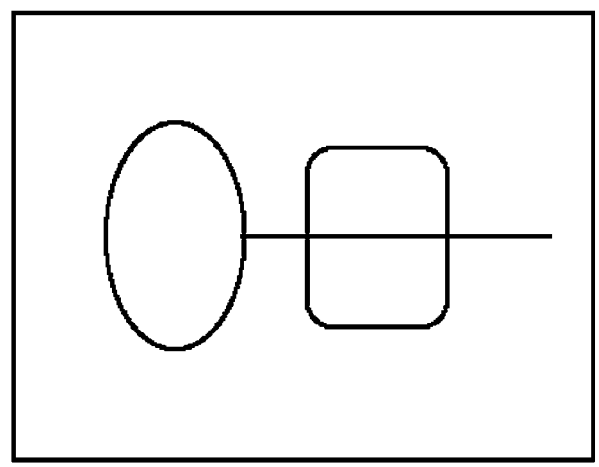
Figure 16C:
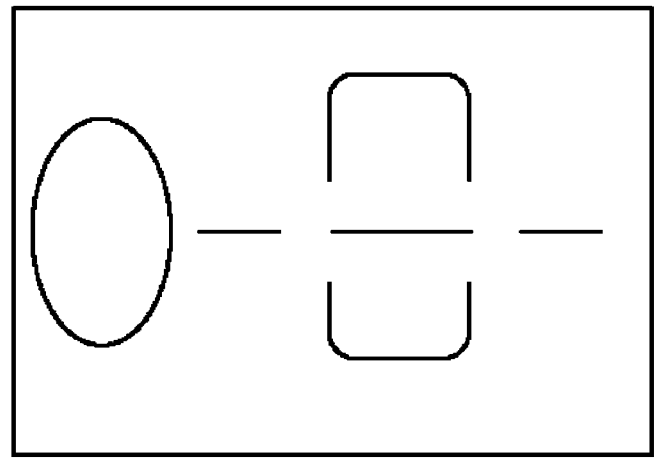

FIGS. 16A to 16C show an example of a case in which a line drawing is converted into vector data representing the centerline of each line element. The binary image (FIG. 16A), which is subject to vectorization, is converted into vector data (FIG. 16B) representing the centerline of each line element. Dividing the vector data in units of line elements produces the state shown in FIG. 16C.

Figure 17:
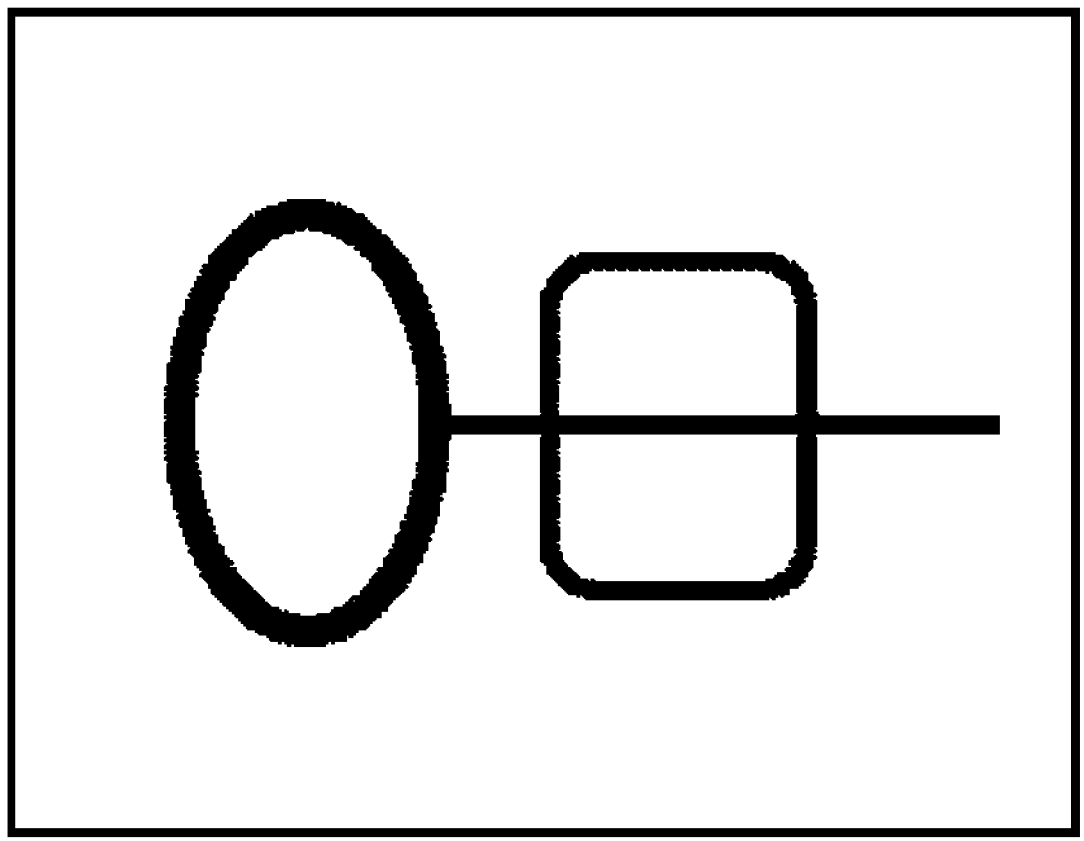
FIG. 17 is an illustration of a case in which character vectorization is applied to a line drawing.

In addition, similarly to the character vectorization, when a line drawing is converted into vector data representing outlines of the drawing in an unchanged form, the image in FIG. 16A is converted into vector data including one outer outline and three inner outlines. This vector data is represented by an object as shown in FIG. 17. Thus, the vector data cannot be divided into part units of line elements as shown in FIG. 16C.

Each line in this vector description is represented by performing filling between outline vectors, and, when the data is deformed, each outline vector needs to be deformed. Thus, it is difficult to freely deform the data, with each line width maintained. Therefore, it may be said that the state in FIG. 16C is better for processing and editing at a reuse time. However, in the line-element vector data shown in FIG. 16C, line-width information is not accurately stored. Accordingly, in display quality, it may be said that the outline vector data shown in FIG. 17 is more accurate for the original image.

Referring back to FIG. 3, in step S309, it is determined whether all the regions in the region information have been processed. If all the regions in the region information have been processed, the process proceeds to step S310. If an unprocessed region remains, the unprocessed region is treated as a region of interest before the process returns to step S304.

In step S310, the multiple-valued image with the character portions filled with the color of the adjacent pixels is compressed by the background-compression unit 218 to generate compressed data. A known compression technique is used for compression. Here, the JPEG (Joint Photographic Experts Group) is used. Since the multiple-valued image obtained by performing the filling is compressed, high compression is performed compared with a case in which the filling is not performed, so that a small file size is produced.

In step S311, output electronic data 220 is generated. The electronic data 220 includes the drawing vector information generated in step S303 as the non-display foreground-layer information 223 shown in FIG. 2, the compressed background data generated in step S310 as the display background-layer information 222 shown in FIG. 2, and the character vector information generated in step S305 as the display foreground-layer information 221 shown in FIG. 2.

The electronic data 220 is described by a graphic language including a vector drawing language capable of describing a curve, a straight line, filling, etc., as vector data, and an image drawing language capable of drawing JPEG image data.

FIG. 10 shows an example of a language of output electronic data having a layered structure in XML (Extensible Markup Language). Referring to FIG. 10, an example of line drawing language information 1001 corresponds to the non-display foreground-layer information 223 in FIG. 2. Specifically, the line drawing language information 1001 includes the elements <path> designating sequential coordinate points and function types such as curves and straight lines connecting them. A compression code 1002 corresponds to the display background-layer information 222 in FIG. 2. Specifically, the compression code 1002 includes the element <image> having compressed image data that is converted to an ASCII (American Standard Code for Information Interchange) character string. Character vector language information 1003 corresponds to the display foreground-layer information 221 in FIG. 2. Specifically, the character vector language information 1003 includes the elements <path> designating sequential coordinate points and function types such as curves and straight lines connecting them, similarly to the case of a line drawing.

As described above, the electronic data 220 generated by the electronic-data generator 210 is transmitted to the personal computer 120. Next, a case in which the received electronic data is used for a display or reuse purpose in the personal computer 120 is described below.

For the display purpose, the display program 121 executed by the personal computer 120 generates image data for display on the basis of the graphic language shown in FIG. 10. Rendering in this case is schematically shown in FIG. 11.

Figure 11:
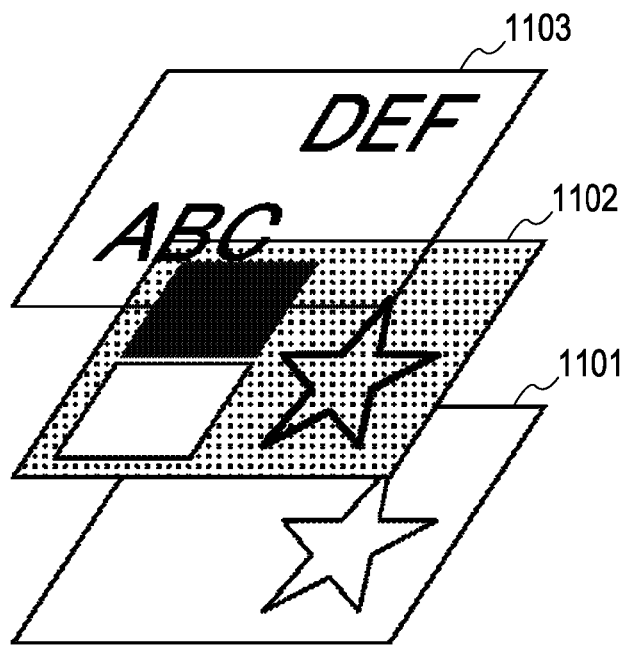
FIG. 11 is an illustration of an output data configuration.

First, the line drawing graphic 1001 is rendered on a one-page-sized blank sheet of paper corresponding to the layer 1101 shown in FIG. 11. The background image 1002 shown in FIG. 10 is rendered as an upper layer 1102. Finally, the graphic 1003 shown in FIG. 10 is rendered as a top layer 1103. Since the layer 1102 is image data having a one-page size, when the layer 1102 is displayed, all the pieces of information on the layer 1101 are hidden to be invisible.

Figure 12:
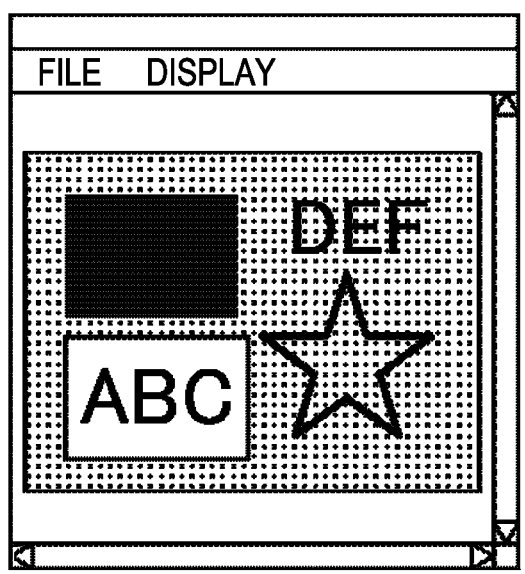
FIG. 12 is an illustration of a display application for output data.

FIG. 12 shows an example of a screen displayed by an application including the display program 121. As described above, the application displays an image with the character vector information 1003 (FIG. 10) superimposed on the background-image information 1002 (FIG. 10).

For the reuse purpose, the reuse program 122 executed by the personal computer 120 generates reusable data in the graphic language shown in FIG. 10.

Figure 13:
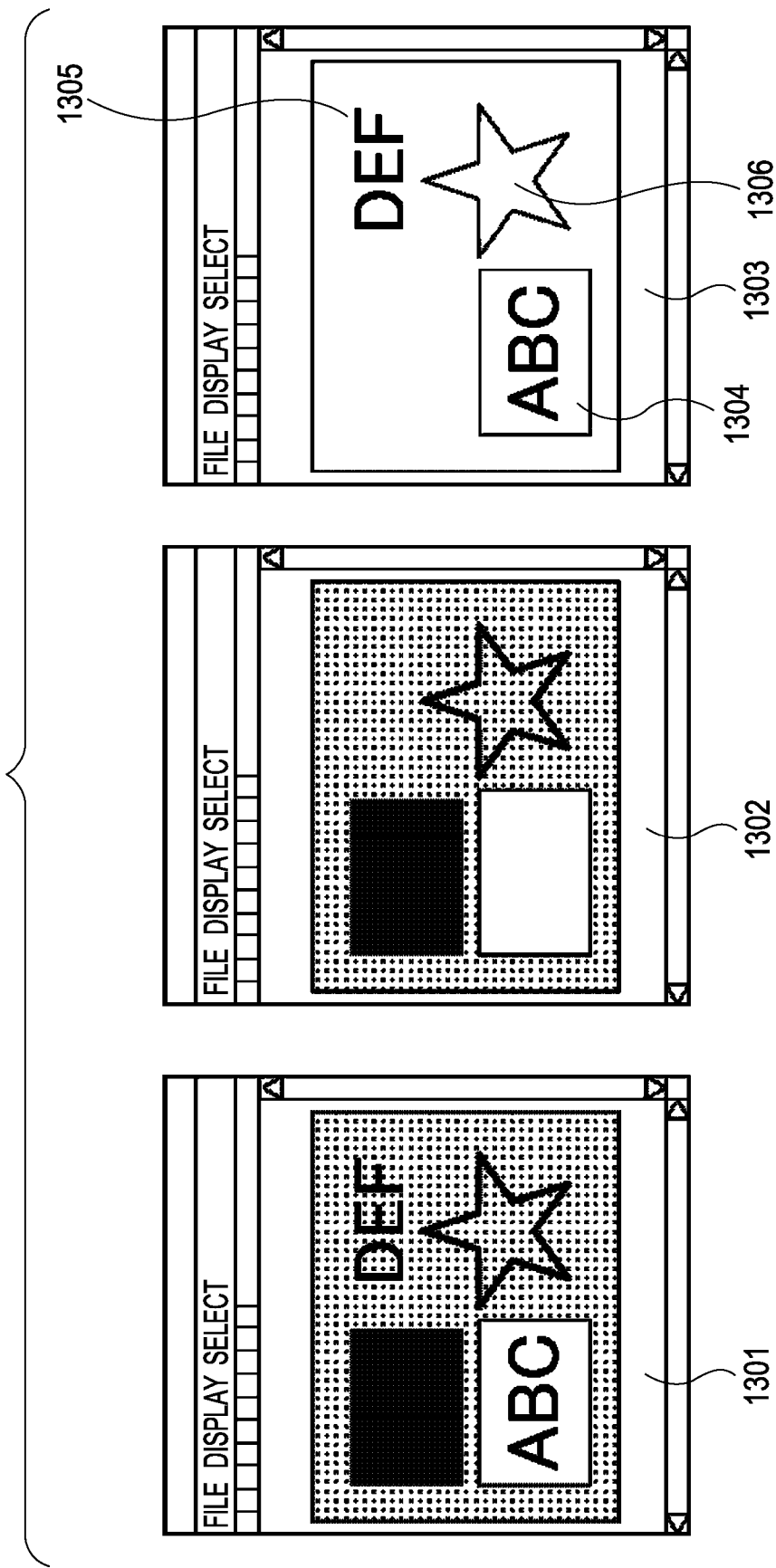
FIG. 13 is an illustration of a reuse application for output data.

FIG. 13 shows examples of screens displayed by an application including the reuse program 122. This application displays an image on the screen by loading electronic data. The application has a function in which, by operating a mouse or the like by the user to select all or part of the displayed image, graphic data corresponding to the selected area is transferred and made reusable for editing or the like in a different application or the like.

A case in which the graphic language data in FIG. 10 is input as an example of the electronic data 220 is described below. In this case, the application, described with reference to FIG. 13, can display a screen 1301 generated by sequentially rendering the information 1001, the information 1002, and the information 1003 similarly to the case of FIG. 12. In addition, the above application can switch between display of a screen 1302 for rendering only the background image information 1002 and display of a screen 1303 for rendering only the information 1001 and the information 1003 excluding the background image information 1002. In this switching, either screen can selectively be displayed in response to a user's operation. In response to a user's operation, each of character groups 1304 and 1305, and a line drawing 1306 can be selected on the screen 1303 in vector data units (graphic data description units) corresponding to each image, and can be transferred to a different document editing application.

When the user issues an instruction to select and reuse the line drawing 1306 on the screen 1303, in the case of the graphic language in FIG. 10, the vector language information 1003 is extracted from the electronic data 220 for reuse. This graphic language is vector language data representing a state in which a line drawing is decomposed into line elements. Thus, as described above, processing and editing are facilitated without considering line width. However, an effect of thinning may cause a case in which appearance does not match that of the original image data, as shown in FIGS. 16A to 16C.

When the electronic data 220 is displayed by using the display application described with reference to FIG. 12, the graphic language of the vector language information 1003 is concealed by the compression code 1002, and what is actually displayed is image data of the line drawing left on the background image. Therefore, information that is close to an input image scanned for the line drawing can be displayed.

In other words, according to the first embodiment, even if a vector description including thinned line elements is used as a line drawing vector language, data suitable for both display and reuse is generated.

The graphic language in FIG. 10 is only an example. Accordingly, a different graphic description language having similar language specifications may be used. For example, similar advantages can be obtained if languages, such as SVG (Scalable Vector Graphics) and PDF (Portable Document Format) are used.

As described above, according to the first embodiment, from an image of a scanned document, information generated by vectorizing a character portion and information generated by vectorizing a line drawing portion are extracted. From the original image, an image on which a character portion of a foreground is filled with peripheral pixels is extracted as background image data. The obtained information and data are converted into electronic data described so as to render line drawing vector data of a non-display foreground, background image data of a displayed background, and character vector data of a display foreground in the order given.

In the electronic data generated as described above, each character portion and each line drawing portion are vectorized for establishing adaptation to an editing use. In particular, the vectorized line drawing portion is good for a processing and editing use since it is obtained from an image obtained by performing thinning. In addition, when the electronic data is used for a display use, for the line drawing portion, instead of a vector description thinned for editing, image information corresponding to the original image is displayed. Thus, the display quality is maintained. In other words, according to the first embodiment, electronic data suitable for both display and reuse can be generated.

Second Embodiment

Figure 14:
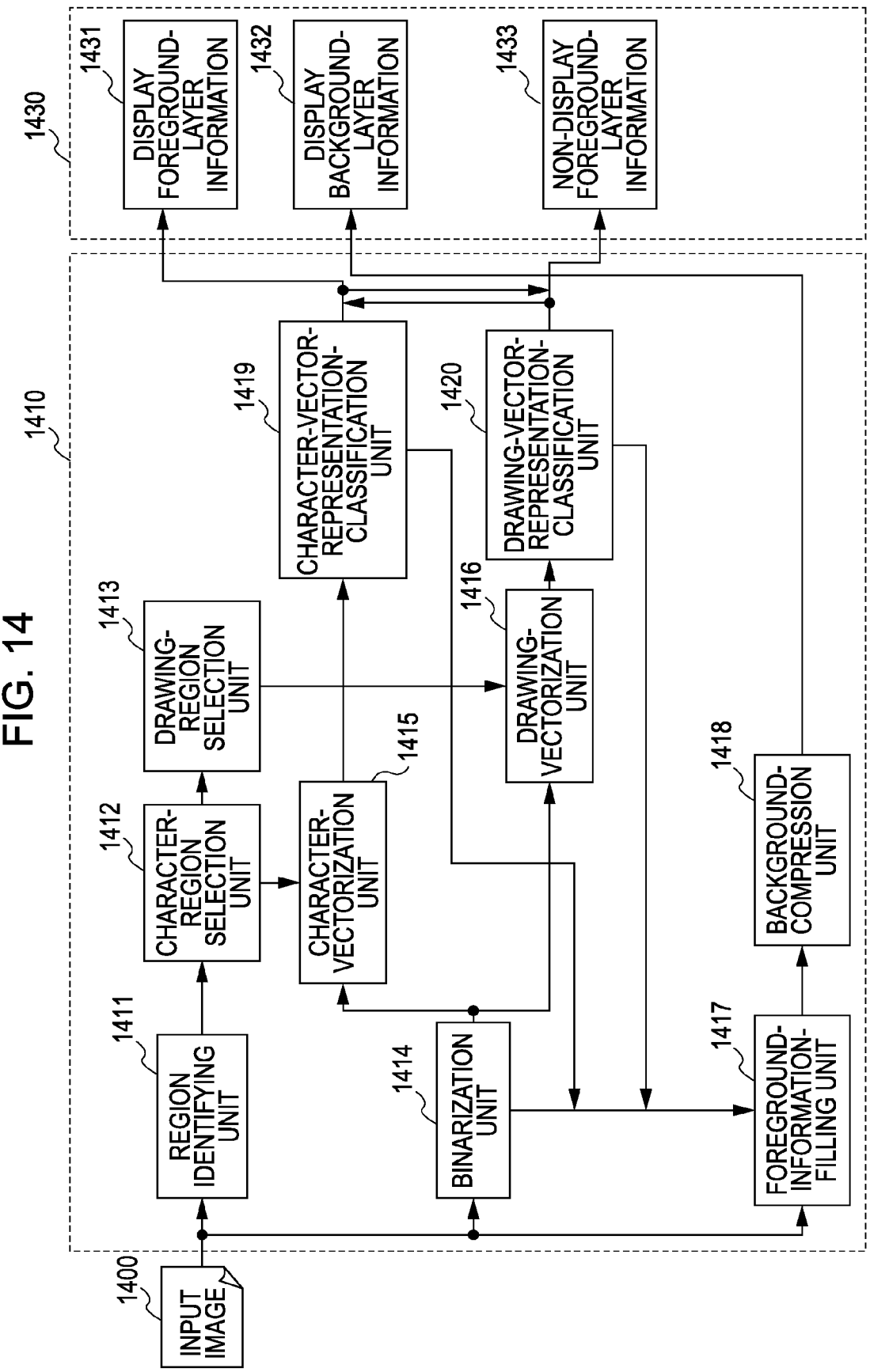
FIG. 14 is a block diagram illustrating an operation of the second embodiment.

FIG. 14 illustrates an operation of a second embodiment of the present invention. The second embodiment is practiced by the configuration exemplified in FIG. 1 similarly to the first embodiment. An input image 1400 is received from the scanner 101 by an electronic-data generator 1410 for generating electronic data from the input image 1400. The electronic-data generator 1410 generates electronic data 1430.

Blocks, represented by reference numerals 1411 to 1420, are schematic representations of processes executed by the electronic-data generator 1410 according to the second embodiment. A region-identifying unit 1411 identifies regions, such as a character, a natural image, and a line drawing, from the input image of a document, and outputs identified regions as region information. A character-region selection unit 1412 selects character information from the region information output by the region-identifying unit 1411. A drawing-region selection unit 1413 selects line-drawing-region information from the region information output by the region-identifying unit 1411. A binarization unit 1414 converts an input multiple-valued color or gray image into a monochrome binary image. A character vectorization unit 1415 extracts and converts outline information of each character from a binary image of the character region into a vector drawing function. A drawing-vectorization unit 1416 extracts and converts line element information of a line drawing from a binary image in the line drawing region into a vector drawing function. A foreground-information-filling unit 1417 generates an image having a filled character portion by filling pixel information corresponding to a foreground with a color identical to the color of a pixel in the vicinity of the foreground. A background compression unit 1418 performs compression by using a multiple-valued image with foreground information filled as a background. A character-vector-representation-classification unit 1419 judges how display foreground information and non-display foreground information a vector drawing function of each character in a character region is classified in units of characters. A drawing-vector-representation-classification unit 1420 judges how display foreground information and non-display foreground information of a vector drawing function of each line element in a line-drawing region is classified in units of line elements.

The electronic data 1430 generated by the electronic-data generator 1410 according to the second embodiment has a data configuration including the following pieces 1431 to 1433 of information. Display foreground-layer information 1431 is, in the generated electronic data 1430, information forming a display foreground-layer. In the second embodiment, the display foreground-layer information 1431 is a group of vector drawing functions including, among pieces of the character vector information generated by the character-vectorization unit 1415, information classified as a display foreground by the character-vector-representation-classification unit 1419, and, among pieces of line-drawing-vector-drawing information generated by the drawing-vectorization unit 1416, information classified as a display foreground by the drawing-vector-representation-classification unit 1420.

Display background-layer information 1432 is, in the generated electronic data 1430, information forming a display background layer, and is, in the second embodiment, a description of compressed background image data generated by the background-compression unit 1418.

Non-display foreground-layer information 1433 is, in the generated electronic data 1430, information forming a non-display foreground layer. The non-display foreground-layer information 1433 is a group of vector drawing functions including, among pieces of character vector information generated by the character-vectorization unit 1415, information that is not classified as a display foreground by the character-vector-representation-classification unit 1419, and, among pieces of line-drawing-vector-drawing information generated by the drawing-vectorization unit 1416, information that is not classified as a display foreground by the drawing-vector-representation-classification unit 1420.

The operation of the second embodiment is described with reference to the flowchart shown in FIG. 15.

In step S1501, multiple-valued image data (color or gray scale image) of the document scanned by the scanner 101 is input.

In step S1502, the binarization unit 1414 generates a monochrome binary image by binarizing the input multiple-valued image with a known binarization technique.

In step S1503, the region-identifying unit 1411 uses a known region-recognition technique to identify regions such as a character group, a line drawing, and a natural image, and generates region information.

Figure 3:
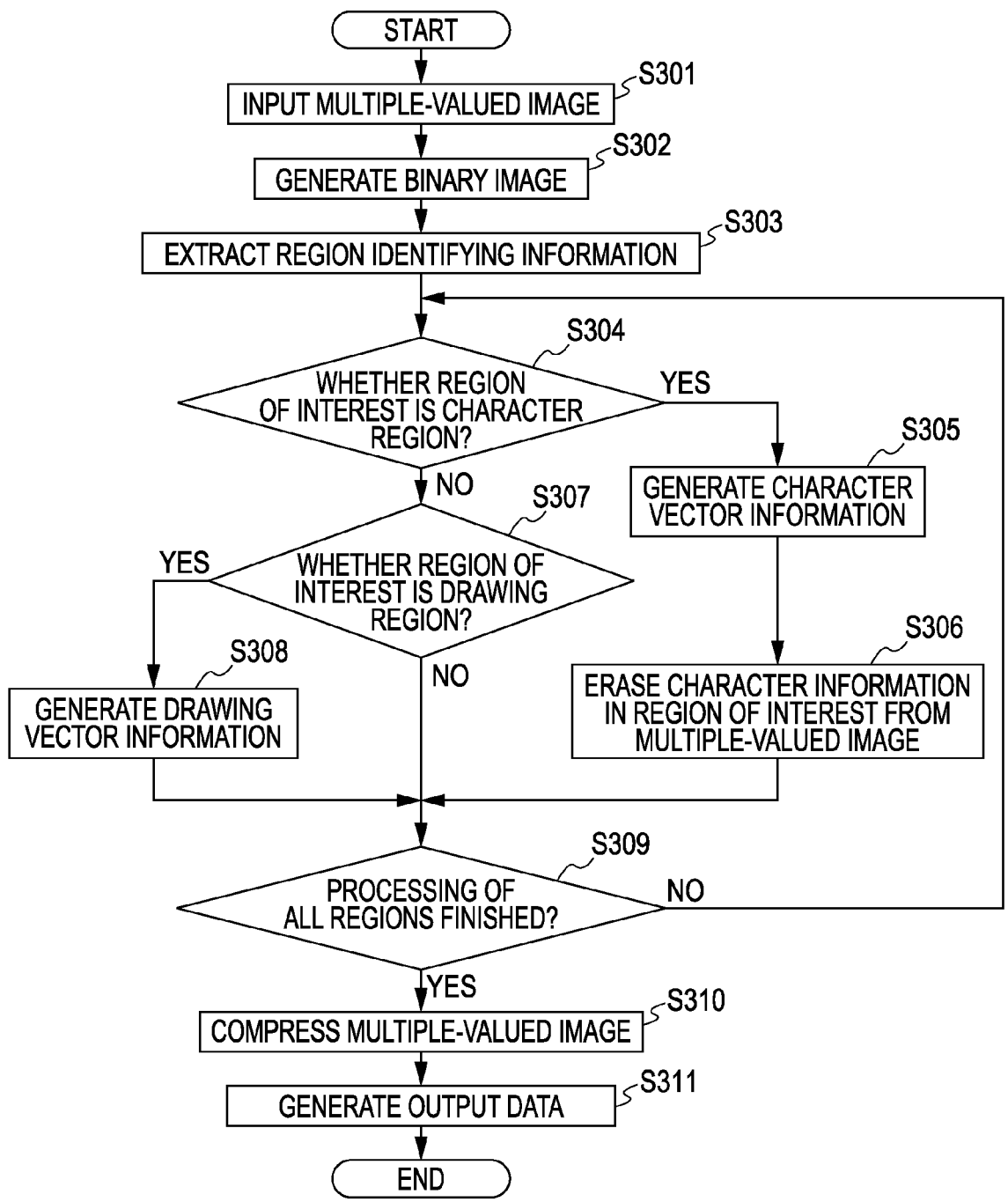
FIG. 3 is a flowchart illustrating a process in the first embodiment.

Steps S1501 to S1503 are similar to steps S301 to S303 in FIG. 3 in the first embodiment. For example, by inputting the color image in FIG. 4, the binary image in FIG. 6 and the region information in FIG. 7 can be obtained.

In steps S1504 to S1516, each extracted region corresponding to each type of information is sequentially treated as a region of interest.

In step S1504, the character-region selection unit 1412 determines whether the region of interest is a character region. If the region of interest is the character region, the process proceeds to step S1505. If the region of interest is not the character region, the process proceeds to step S1510. In step S1505, the character-vectorization unit 1415 generates character vector information for the character region in the region of interest. Here, characters to be vectorized exist as sets of connected black pixels in the binary image. Thus, similarly to the first embodiment, by using the binary-image-vectorization technology, their outlines are converted into vector descriptions represented by a set of straight line and curve functions.

Steps S1506 to S1509 are performed character by character in units of individual characters included in a character region of interest. Here, the units of individual characters are units of the connected pixels extracted during the course of process. Alternatively, by using a different known character extracting technique (for example, a method for separation into character units by using a histogram), the character-vector generation in step S1505 may be performed after dividing the character region into fine rectangular regions corresponding to characters.

In step S1506, the character-vector-representation-classification unit 1419 judges whether or not vector information of each character is to be classified as the display foreground information. If it is determined that the vector information is to be classified as the display-foreground information, the process proceeds to step S1507. If it is determined that the vector information is not to be classified as the display-foreground information, the process proceeds to step S1509.

In the judgment, when comparing vector information of one character of interest with information of a corresponding portion on an input original image in terms of display-image quality and reproducibility, if the vector information of the character of interest slightly differs in display (for example, color and shape), it is judged that the vector information of the character of interest is to be classified as the display-foreground information.

Specifically, the character-vector description generated by the character-vectorization unit 1415 describes filling of an area between an outer outline and an inner outline with a single color. Thus, it is a classification condition that the character has a single color. Judgment of whether a character has a single color may be performed by acquiring pixel values from pixels corresponding to the foreground in the character on the input multiple-valued image, that is, from all pixels at positions corresponding to black pixels determined to be included in the character portion on the binary image, and determining whether or not the pixel values are equal to one another. The determination of whether or not the pixel values are equal to one another may be performed by finding a variance of each of RGB components or color-difference component variance, and comparing the variance with a threshold value.

The above judgment is an example when the vector description method in the second embodiment is used. Accordingly, when a different vector-description method is used, a different viewpoint is used to enable the judgment. For example, when using a description of designating different colors for a vector outline and interior filling, pixel colors on the original image are separately acquired for an outline and the interior, and, if it is determined that both colors are identical, it may be judged that the information is the display-foreground information.

Figure 15:
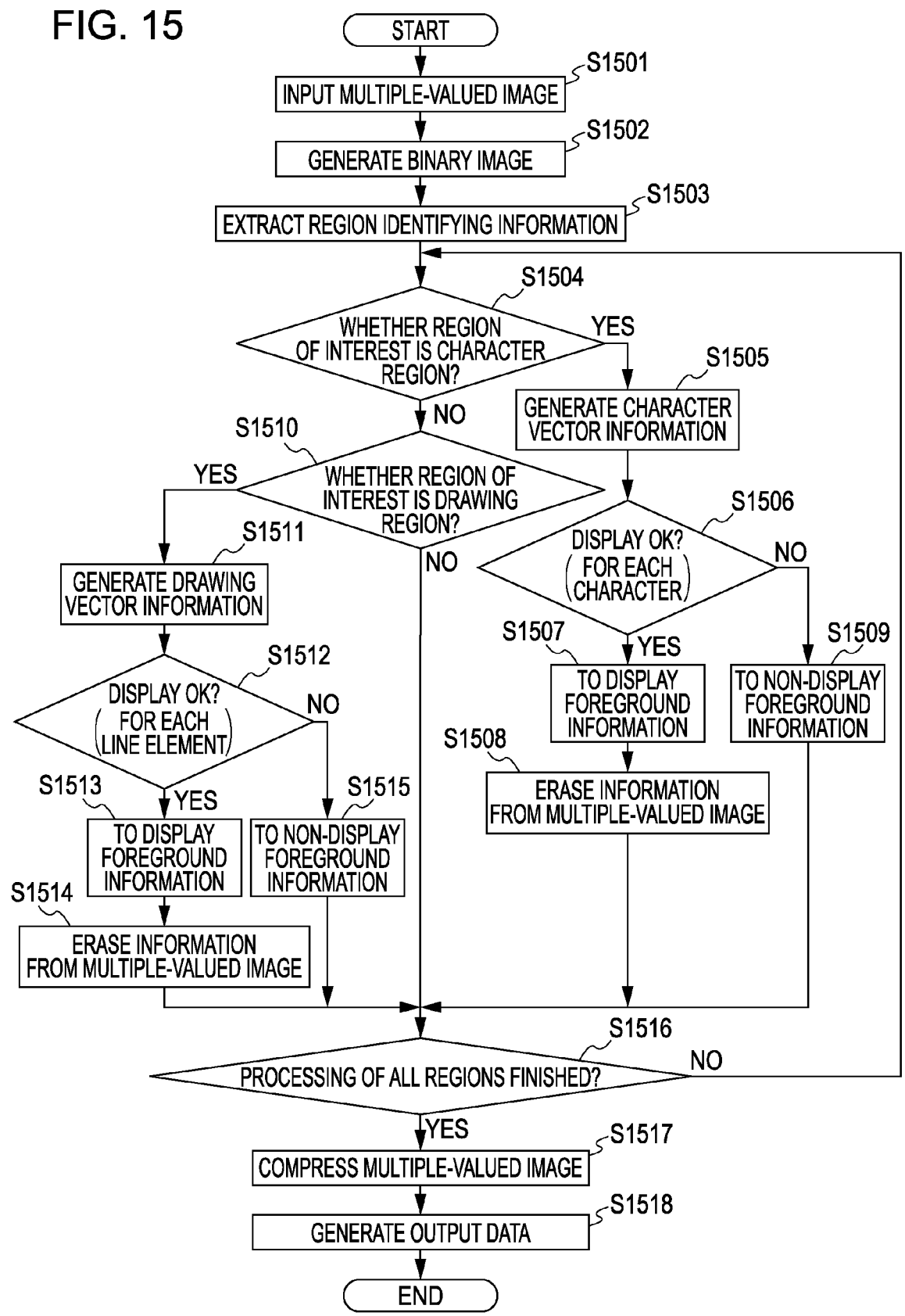
FIG. 15 is a flowchart illustrating a process in the second embodiment.

Referring to FIG. 15, in step S1507, the vector-information description of one character classified in step S1506 as the display foreground is added to the display foreground-layer information 1431. At this time, the character-color information obtained in the above judgment is added to the vector description.

In step S1508, the foreground-information-filling unit 1417 performs filling by changing foreground pixels of a pixel of interest in the multiple-valued image to have a color identical to the color of peripheral pixels. Specific filling may be performed similarly to that described in the first embodiment.

In step S1509, the vector information description of the character that is not classified in step S1506 as the display foreground information is added to the non-display foreground-layer information 1433. In information of a plurality of characters obtained on the basis of the original image in the course of the judgment in step S1506, information of the main color may be added as rendering color information.

Processing in steps S1506 to S1509 is performed on all the characters in the character region before the process proceeds to step S1516.

In step S1510, the drawing-region selection unit 1413 determines whether the region of interest is a line-drawing region. If the region of interest is the line-drawing region, the process proceeds to step S1511. If the region of interest is not the line-drawing region, the process proceeds to step S1516.

In step S1511, the drawing-vectorization unit 1416 generates line-drawing-vector information in the region of interest. The line-drawing-vector information is generated as described in the first embodiment.

Steps S1512 to S1515 are performed line element by line element in units of line elements included in the line-drawing region of interest. The units of line elements are extracted in the course of line-drawing-vector generation in step S1511.

In step S1512, the drawing-vector-representation-classification unit 1420 judges whether or not the vector information of the line element of interest is to be classified as the display foreground information. If it is judged that the vector information of the line element of interest is to be classified as the display foreground information, the process proceeds to step S1513. If it is judged that the vector information of the line element of interest is not to be classified as the display foreground information, the process proceeds to step S1515.

In the above judgment, when comparing the vector information of the line element of interest with information of a corresponding portion in the input original image in terms of display quality and reproducibility, if the vector information of the line element of interest slightly differs in display (for example, color and shape), it is judged that the vector information of the line element of interest is to be classified as the display foreground information. Specifically, the line-element-vector description generated by the drawing-vectorization unit 1416 describes rendering by using a constant line width and a single color. Thus, it is a classification condition that the line element in the original image has a constant width and a single color.

Determination of whether the line element has a constant width may be performed, for example, in the following manner. A thinning-implemented binary image, generated in the course of line-element extraction, having only the line element, is prepared. On the line element, points for dividing the line element into n equal parts are provided, where n may be a predetermined integer or may be determined depending of the length of the line element. Next, a direction perpendicular to a local orientation of the line element is found from each point. This direction may be quantized into eight directions, that is, upward, downward, left, right, and oblique directions, or may be divided into smaller angles. By searching for a pixel on the binary image in each direction from the point, a search length up to a pixel in which its pixel value changes from black to white is found. In addition, a pixel is searched for in an opposite direction from the point. It is determined whether or not a total of 2n search lengths obtained at the points are regarded as statistically constant. If it is determined that the 2n search lengths are regarded as statistically constant, the line element has a constant width. Also, the double of the constant search length serves as the line width of the line element.

In determination of whether or not the line element has a single color, the thinning-implemented binary image of the line element used in the above determination is processed for expansion by a number of times that is a half of the obtained width. For the processing for expansion, a known technique may be used. For example, images formed by performing pixel shifting in eight directions pixel by pixel are ORed, whereby a one-pixel expanded image can be created. Two ends of the line element are lengthened by a number of times the processing for expansion is performed. Thus, the line element needs to be shortened by the number of pixels for expansion. By performing logical multiplication between the expanded line element image and an unexpanded binary image, a binary image having only a line element of interest can be obtained. After that, regarding pixels on a multiple-valued image that correspond to black pixels on the binary image, by determining equality of their pixel values, it is determined whether or not the line element has a single color.

The above determination is an example of a case in which the line drawing description method in the second embodiment is used. When a vector description in a different method is used, determination using different viewpoints may be performed.

Referring back to FIG. 15, in step S1513, the vector information of the line element of interest that is classified as the display foreground information, is added to the display foreground-layer information 1431. At this time, the information of the line width and line-element color, obtained in the course of the determination, is added to the display foreground-layer information 1431.

Next, in step S1514, the foreground-information-filling unit 1417 performs filling by changing foreground pixels in the line element of interest on the multiple-valued image to have a color identical to the color of peripheral pixels. Specific filling may be performed similarly to that described in the first embodiment. For filling the line element, the binary image for each line element used in the line-element-color determination may be used.

In step S1515, the vector information of the line element of interest determined in step S1512 to be not to be classified as the display foreground information is added to the non-display foreground-layer information 1433.

Processing in steps S1512 to S1515 is performed on all the line elements in the line-drawing region before the process proceeds to step S1516.

In step S1516, it is determined whether or not all the regions of the region information have been processed. If the regions have already been processed, the process proceeds to step S1517. If an unprocessed region remains, the region is treated as a region of interest, and the process returns to step S1504.

In step S1517, the background-compression unit 1418 generates compressed data by compressing the filled multiple-valued image. As a compression method, a known technique is used. Here, JPEG compression is used. Since a portion corresponding to the display foreground information is filled with the peripheral-pixel color in steps S1508 and S1514, a JPEG-compressed background image is more highly compressed compared than an image to which filling is not implemented.

In step S1518, the output electronic data 1430 is generated. The output electronic data 1430 includes the non-display character vector information added in step S1509 and non-display line-element vector information added in step S1515 as the non-display foreground-layer information 1433 in FIG. 14, the compressed background data generated in step S1517 as the display background layer information 1432 in FIG. 14, and the display character vector information added in step S1507 and display line-element-vector information added in step S1513 as the display foreground-layer information 1431 in FIG. 14.

A case in which the multiple-valued image, shown in FIG. 18A, including a character region, is input to the electronic-data generator 1410 according to the above-described second embodiment is described below.

Figure 18A:
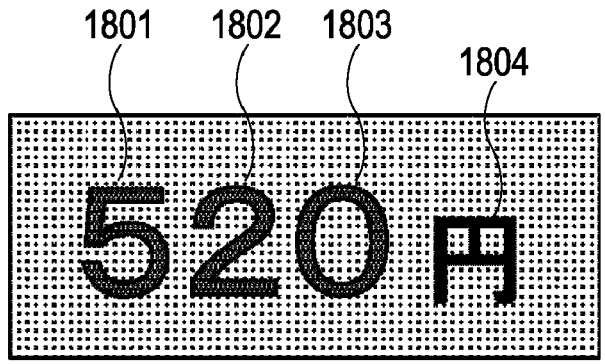
FIGS. 18A, 18B, and 18C are illustrations of an example of character vectorization in the second embodiment.
Figure 18B:
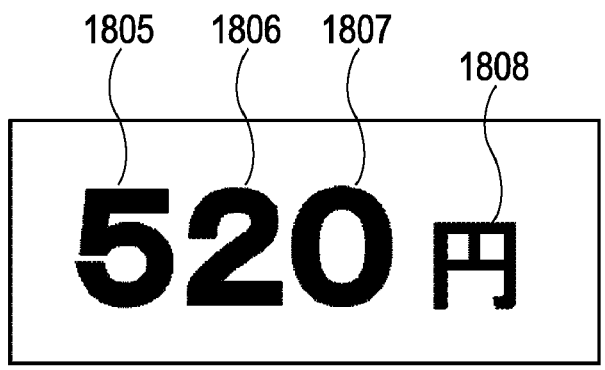

The character region in FIG. 18A includes four characters 1801, 1802, 1803, and 1804. The characters 1801 to 1803 are green therein, with them skirted by red. The character 1804 is in a single color of black. The character region in FIG. 18A is binarized by the binarization unit 1414 to produce the binary image shown in FIG. 18B. The character-vectorization unit 1415 performs character vectorization on characters 1805, 1806, 1807, and 1808 as connected pixels. The character-vector-representation-classification unit 1419 acquires color information of the interior of each connected pixel from the multiple-valued image. Character-vector data of the character 1808, which is determined to have the single color, is classified as the display foreground information. Character vector data of the characters 1805 to 1807, which are determined to be not in the single color since two colors are detected, is classified as the non-display foreground information.

Figure 18C:
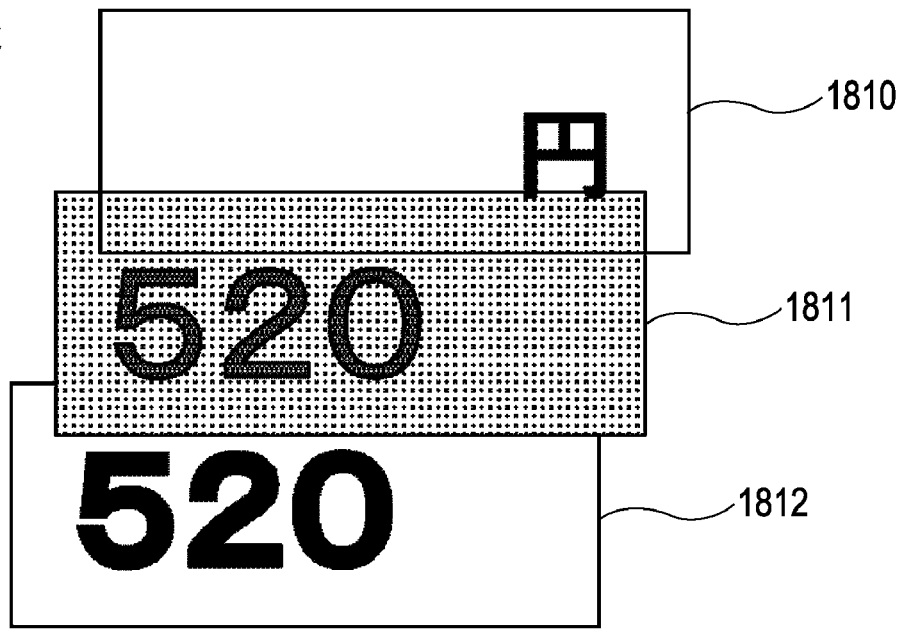

In this case, as shown in FIG. 18C, the output electronic data 1430 has a three-layer structure including display foreground information 1810 has a three-layer structure having a vector description of the pixels 1808, display background information 1811 obtained by using filling to eliminate foreground information corresponding to the pixels 1808 on the multiple-valued image, and non-display foreground information 1812 including vector descriptions of the pixels 1805 to 1807.

Figure 19:
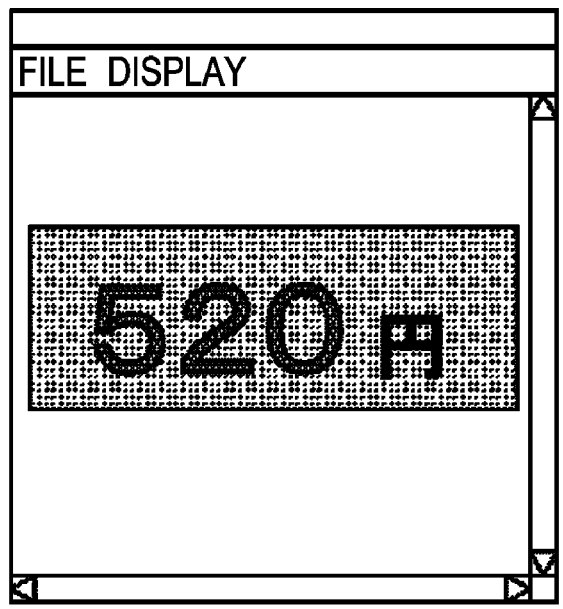
FIG. 19 is an illustration of an example of a display application screen for a character portion in output data in the second embodiment.

When the output electronic data 1430 is input to the display application described in the first embodiment, the screen shown in FIG. 19 is displayed. This screen is displayed, with the color-decorated three characters 1801 to 1803 in FIG. 18A rendered as image data included in the display foreground information, and only the character 1804 rendered as the character-vector description on the background image, so that the appearance matches that of the original image.

Figure 20:
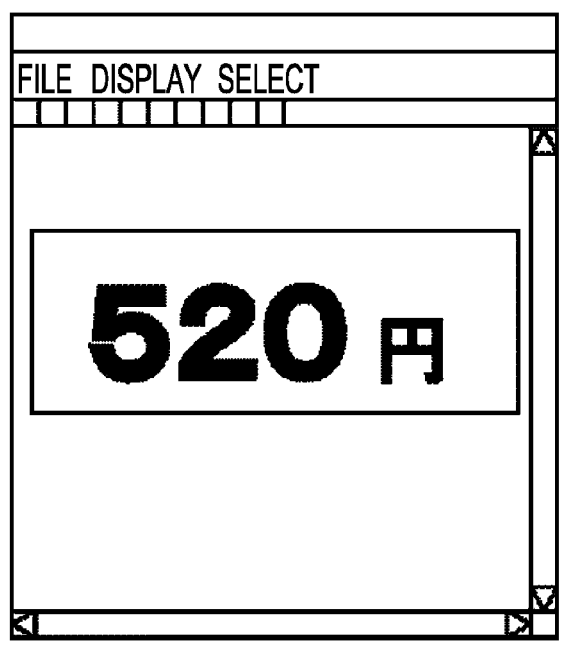
FIG. 20 is an illustration of an example of a reuse application screen for the character portion in output data in the second embodiment.

In addition, in a case in which, by inputting the output electronic data 1430 to the reuse application described in the first embodiment, a display form is switched so that the display foreground information 1810 and the non-display foreground information 1812 are displayed and the display background information 1811 is not displayed, and the screen shown in FIG. 20 is displayed. In this case, the characters 1801 to 1803 are displayed in a single color of green and the character is displayed in a single color of black, and the characters 1801 to 1804 are in a state in which they can be acquired as easily reusable vector data. The characters 1801 to 1804 as the character vector data are reusable in the editing application.

As described above, according to the second embodiment, even if a vector description describing a single color is used for an image including characters in many colors, electronic data optimal for display and reuse can be generated.

Figure 21C:
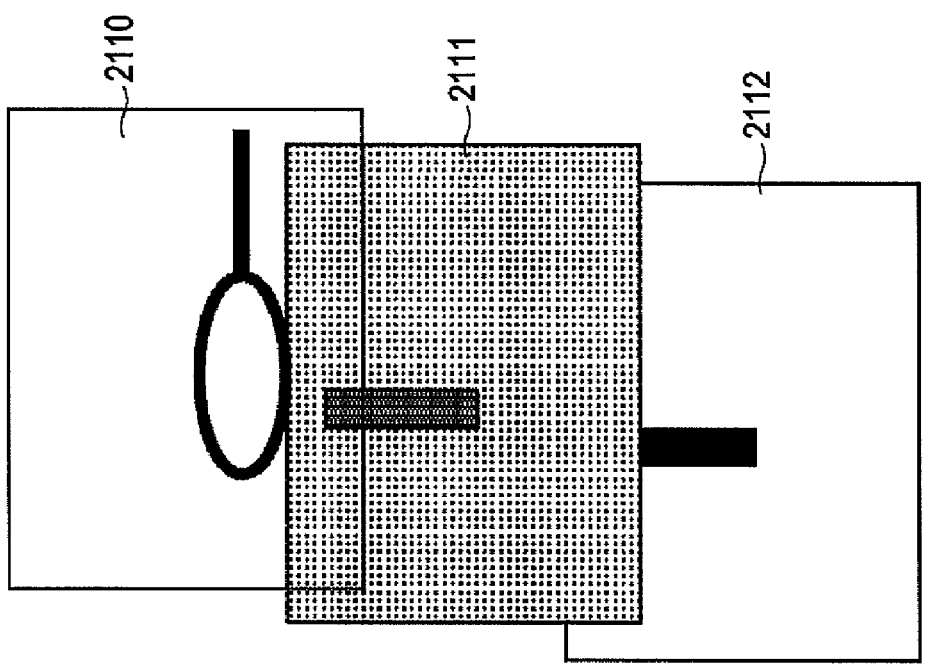
FIGS. 21A, 21B, and 21C are illustrations of an example of line drawing.
Figure 21A:
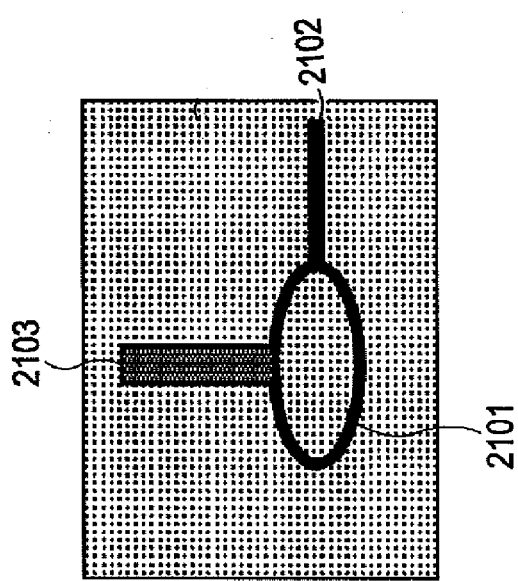

A case in which the a multiple-valued image including the line-drawing region shown in FIG. 21A is input to the electronic-data generator 1410 according to the second embodiment is described below.

Figure 21B:
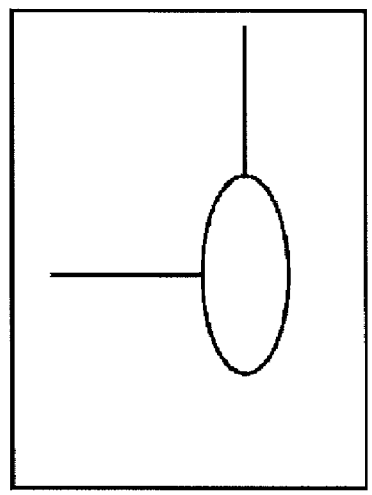

In the line drawing shown in FIG. 21A, an ellipse 2101 and a straight line 2102 are in a single color of red, and a straight line 2103 is brown therein, with it skirted by black. By binarizing the multiple-valued image and implementing thinning on the line-drawing region, the image shown in FIG. 21B is generated. On the basis of the thinning-implemented image, the drawing-vectorization unit 1416 generates vector information having the lines 2101 to 2103 as line elements. The drawing-vector-representation-classification unit 1420 extracts a line width and line color from each line element, whereby the line elements corresponding to the lines 2101 and 2102 are classified as display foreground information, and the line element corresponding to the line 2103 is classified as brown non-display foreground information on the basis of, for example, an interior filling color.

In this case, as shown in FIG. 21C, the output electronic data 1430 has a three-layer structure having display foreground information 2110 including only vector descriptions concerning the line elements corresponding to the lines 2101 and 2102, display background information 2111 obtained by using filling to eliminate the foreground information of the lines 2101 and 2102 on the multiple-valued image, and non-display foreground information 2112 including only the vector description of the line 2103.

Figure 22:
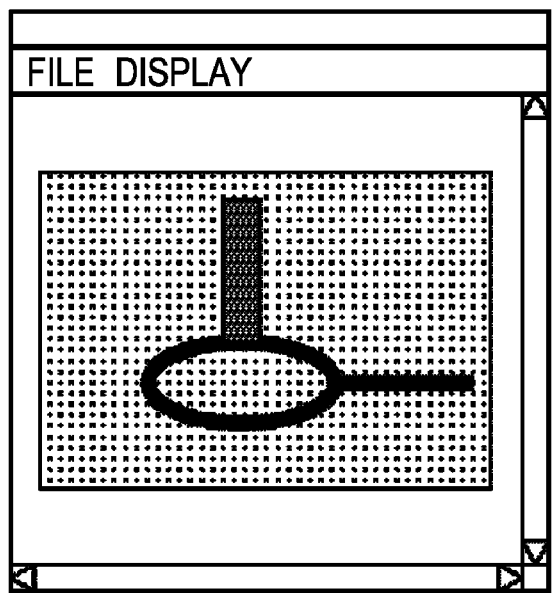
FIG. 22 is an illustration of a display application screen for a line drawing portion in output data in the second embodiment.

When the output electronic data 1430 is input to the display application described in the first embodiment, the screen shown in FIG. 22 is displayed. This screen is displayed, with the color-decorated line 2103 in FIG. 21A rendered as image data included in the display foreground information, and the red ellipse 2101 and straight line 2102 rendered as line-element vector descriptions on the background image, so that the appearance matches that of the original image.

Figure 23:
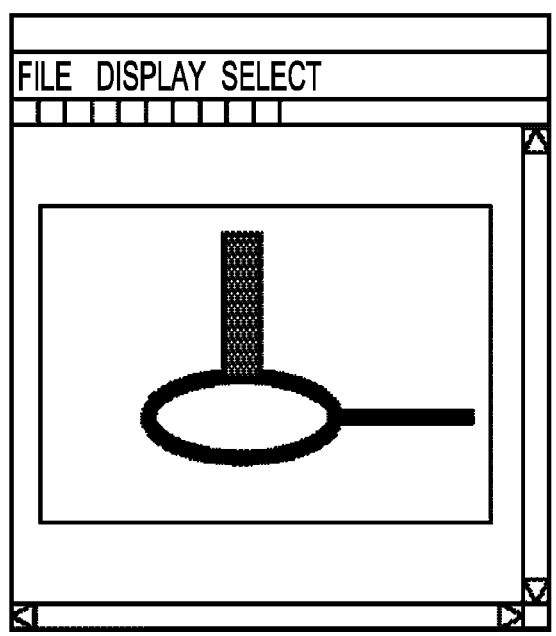
FIG. 23 is an illustration of an example of a reuse application screen for a line drawing portion in output data in the second embodiment.

When the output electronic data 1430 is input to the reuse application described in the first embodiment, the screen shown in FIG. 23 is displayed with only display foreground information and non-display foreground information displayed. All the line elements in the line drawing can be acquired as easily reusable vector data.

As described above, according to the second embodiment, even if the vector description describing each single color is used for an image including line elements of a line drawing in many colors, electronic data optimal for both display and reuse can be generated.

As described above, according to the second embodiment, in the information obtained by vectorizing the character region, single-color character information, and, in the information obtained by vectorizing the line-drawing region, information of each line element having a single color and a constant line width are stored as display foreground information. In addition, an image, obtained such that a portion (on the original image) corresponding as background information to the display foreground information is filled with peripheral pixels and the filled image is compressed, is stored. Furthermore, in each of character information and line-drawing information, information that is not classified as the display foreground information is stored as non-display foreground information. The stored pieces of information are converted into electronic data including a graphic description for rendering vector data of a non-display foreground, a background image of a displayed background, and vector data of a display foreground in the order given.

The electronic data generated as described above is good for an editing use since all the information is vector data in the character and line-drawing regions. In addition, when the electronic data is used for a display use, among vector descriptions of the character and line-drawing regions, vector data of character and line-drawing regions having small differences from those on the original image is used for display. Conversely, regarding vector data of character and line-drawing regions from which image information corresponding to the original image cannot be displayed, the original image portion is displayed unchanged by using a background image.

This can maintain display quality. In other words, electronic data suitable for both display and reuse can be generated.

Third Embodiment

Figure 24:
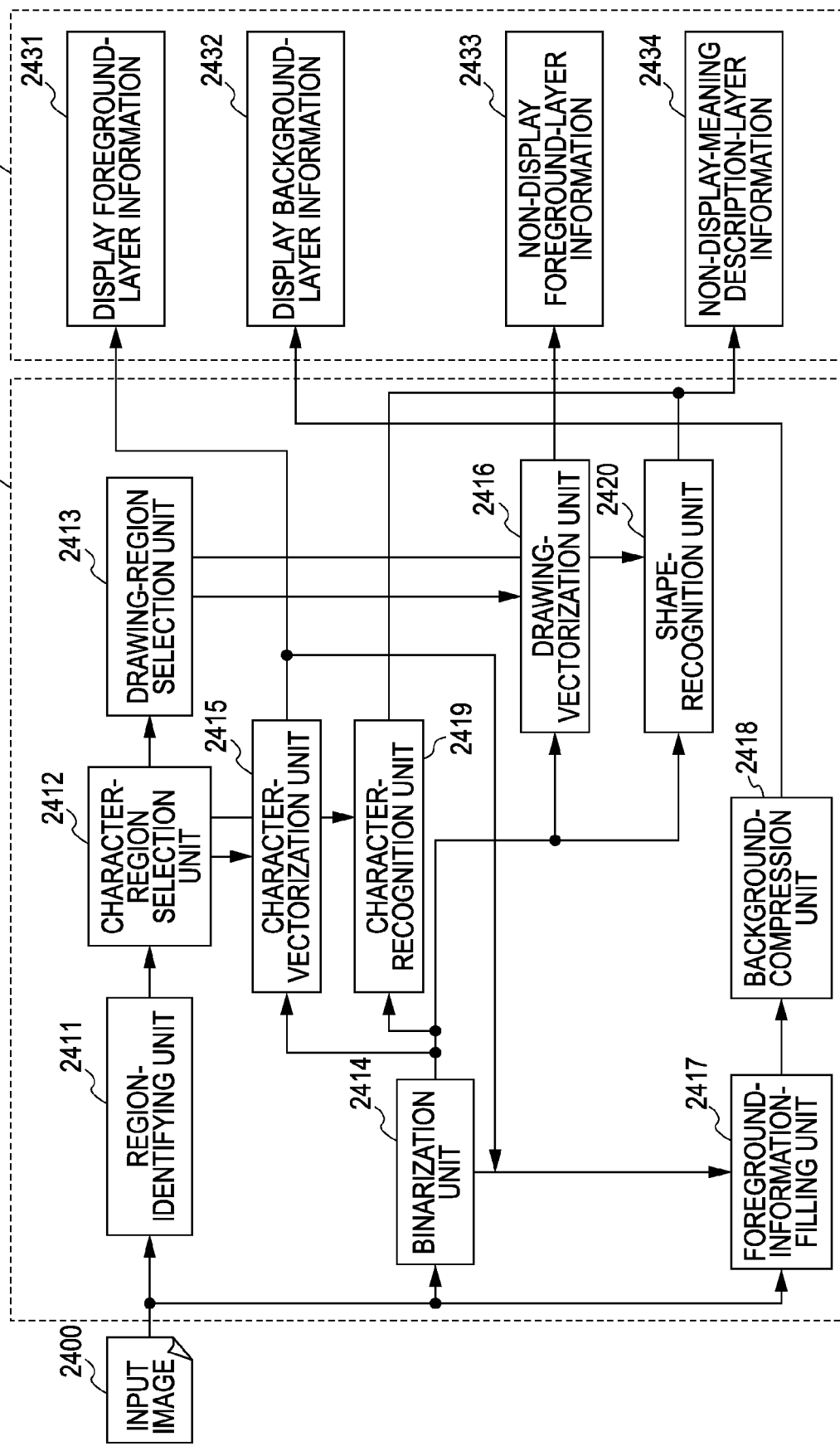
FIG. 24 is a block diagram illustrating an operation of the third embodiment.

FIG. 24 illustrates an operation of a third embodiment of the present invention. The third embodiment is practiced by the configuration exemplified in FIG. 1 similarly to the first embodiment. An electronic-data generator 2410 receives an input image 2400 from the scanner 101, and generates electronic data 2430 from the input image 2400.

Blocks, represented by reference numerals 2411 to 2420, are schematic representations of processes executed by the electronic-data generator 2410. A region-identifying unit 2411 identifies regions, such as a character, a natural image, and a line drawing, from the input image of a document, and outputs identified regions as region information. A character-region selection unit 2412 selects character information from the region information output by the region-identifying unit 2411. A drawing-region selection unit 2413 selects line-drawing-region information from the region information output by the region-identifying unit 2411. A binarization unit 2414 converts an input multiple-valued color or gray image into a monochrome binary image. A character-vectorization unit 2415 extracts and converts outline information of each character from a binary image of the character region into a vector drawing function. A drawing-vectorization unit 2416 extracts and converts line-element information of a line drawing from a binary image in the line-drawing region into a vector drawing function. A foreground-information-filling unit 2417 generates an image having a filled character portion by filling pixel information corresponding to a foreground with a color identical to the color of a pixel in the vicinity of the foreground. A background-compression unit 2418 performs compression with a multiple-valued image with foreground information filled as a background. A character-recognition unit 2419 generates character code information by recognizing character-image information. A shape-recognition unit 2420 generates shape-code information by recognizing line-drawing-image information.

The electronic data 2430 generated by the electronic-data generator 2410 includes the following data configuration. Display foreground-layer information 2431 is, in the generated electronic data 2430, information forming a display foreground-layer. In the third embodiment, the display foreground-layer information 2431 is a group of character-vector drawing functions generated by the character-vectorization unit 2415. Display background-layer information 2432 is, in the generated electronic data 2430, information forming a display background layer, and is, in the third embodiment, a description of compressed background image data generated by the background-compression unit 2418. Non-display foreground-layer information 2433 is, in the generated electronic data 2430, information forming a non-display foreground layer. In the third embodiment, the non-display foreground-layer information 2433 is a description of a group of line-drawing-vector drawing functions generated by the drawing-vectorization unit 2416. Non-display-meaning description layer information 2434 is, in the generated electronic data 2430, a meaning description layer for non-display. In the third embodiment, the non-display-meaning description layer information 2434 includes descriptions of character codes generated by the character-recognition unit 2419 and shape code generated by the shape-recognition unit 2420.

Figure 25:
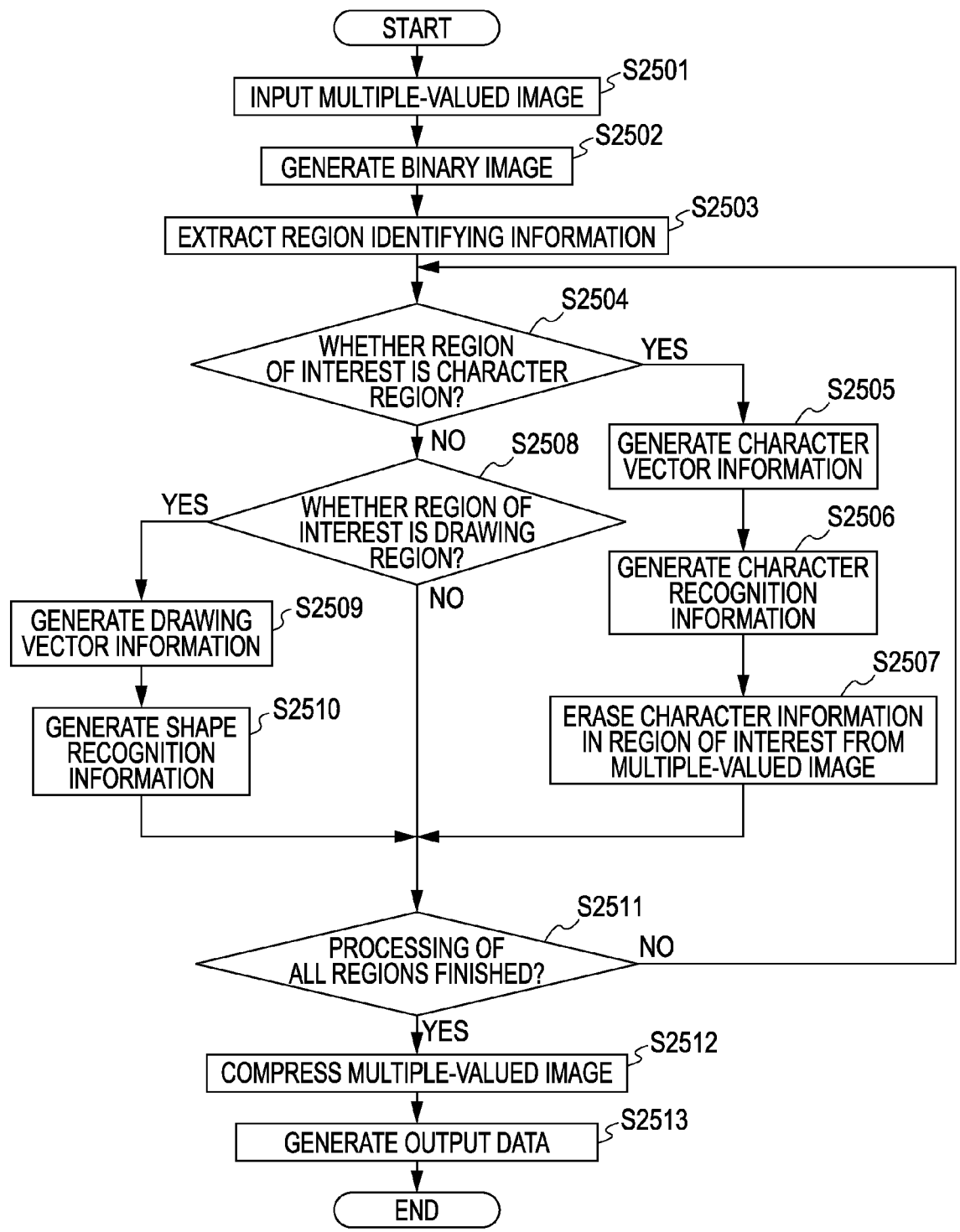
FIG. 25 is a flowchart illustrating a process in the third embodiment.

The operation of the third embodiment is described below with reference to the flowchart shown in FIG. 25.

In step S2501, multiple-valued image data of a document scanned by the scanner 101 is input.

In step S2502, the binarization unit 2414 generates a monochrome binary image by binarizing the input multiple-valued image with a known binarization technique.

In step S2503, the region-identifying unit 2411 uses a known region-recognition technique to identify regions such as a character group, a line drawing, and a natural image, and generates region information.

In steps S2504 to S2511, each extracted region corresponding to each type of information is sequentially treated as a region of interest.

In step S2504, the region-identifying unit 2411 determines whether or not the region of interest is a character region. The region information generated in step S2503 includes its type as an attribute. Accordingly, in step S2504, the binarization unit 2414 only needs to determine whether the attribute represents a character. If the attribute represents the character, the process proceeds to step S2505. If the attribute does not represent the character, the process proceeds to step S2508.

In step S2505, the character-vectorization unit 2415 generates character-vector information for a character portion in the region of interest.

In step S2506, by using a known character-recognition technology, the character-recognition unit 2419 recognizes a character image in the region and generates a character code.

In step S2507, the foreground-information-filling unit 2417 changes pixels on the multiple-valued image corresponding to the character portion in the region of interest to have a color identical to the color of peripheral pixels.

In step S2508, the drawing-region selection unit 2412 determines whether the region of interest is a line-drawing region. If the region of interest is the line-drawing region, the process proceeds to step S2509. If the region of interest is not the line-drawing region, the process proceeds to step S2511.

In step S2509, the drawing-vectorization unit 2416 generates line-drawing vector information of the interior of the region of interest. The line-drawing vector information is generated similarly to processing in the first embodiment.

In step S2510, the shape-recognition unit 2420 performs shape recognition to generate a shape code.

An example of shape recognition is described below. An input binary image in a line-drawing region is normalized into constant width and height. From the normalized image, edge information is extracted, and a feature is extracted on the basis of the edge information. By comparing this feature with dictionary patterns created beforehand by normalizing the figure patterns shown in FIG. 29 and extracting features from the normalized patterns, a feature pattern having the highest similarity is selected and its type is output as a shape code. In this case, for the same type of figure, by registering, in the dictionary, also figure patterns turned in units of 15 degrees with the same shape code, even if a turned line drawing lies on the input image, it can be coded.

This shape recognition is only an example. Accordingly, shape recognition may be performed by using a different method.

In step S2511, if it is determined that all the regions of the region information have already been processed, the process proceeds to step S2512. If an unprocessed region remains, the region is treated as a region of interest and the process proceeds to step S2504.

In step S2512, the background-compression unit 2418 generates compressed data of the multiple-valued image. Here, JPEG compression is used.

In step S2513, the electronic data 2430 is generated. The electronic data 2430 includes the character-recognition information generated in step S2506 and shape-recognition information generated in step S2510 as the non-display-meaning description-layer information 2434, the line-drawing information generated in step S2509 as the non-display foreground-layer information 2433, the compressed background data generated in step S2512 as the display background-layer information 2432, and the character vector information generated in step S2505 as the display foreground-layer information 2431.

FIG. 26 shows an example of description of output electronic data in XML format. Character code and shape code description information 2600 corresponds to the non-display-meaning description-layer information 2434. Specifically, the recognized-character code string described in the element <text>, and the recognized-shape code group described in the element <shape>. Line-element language information 2601 corresponds to the non-display foreground-layer information 2433. Specifically, the language information 2601 includes the elements <path> designating sequential coordinate points and function types such as curves and straight lines connecting them. A compressed background-image code 2602 corresponds to the display background-layer information 2432. Specifically, the compressed background-image code 2602 includes the element <image> having compressed image data converted into an ASCII character string. Character vector description information 2603 corresponds to the display foreground-layer information 2431. Specifically, the character vector language information 2603 includes the elements <path> designating sequential coordinate points and function types such as curves and straight lines connecting them.

The electronic data 2430 generated by the above-described electronic-data generator 2410 is transmitted to, for example, the personal computer 120 in FIG. 1. Next, a case in which the personal computer 120 uses the received electronic data 2430 for a display or reuse purpose is described below.

Figure 27:
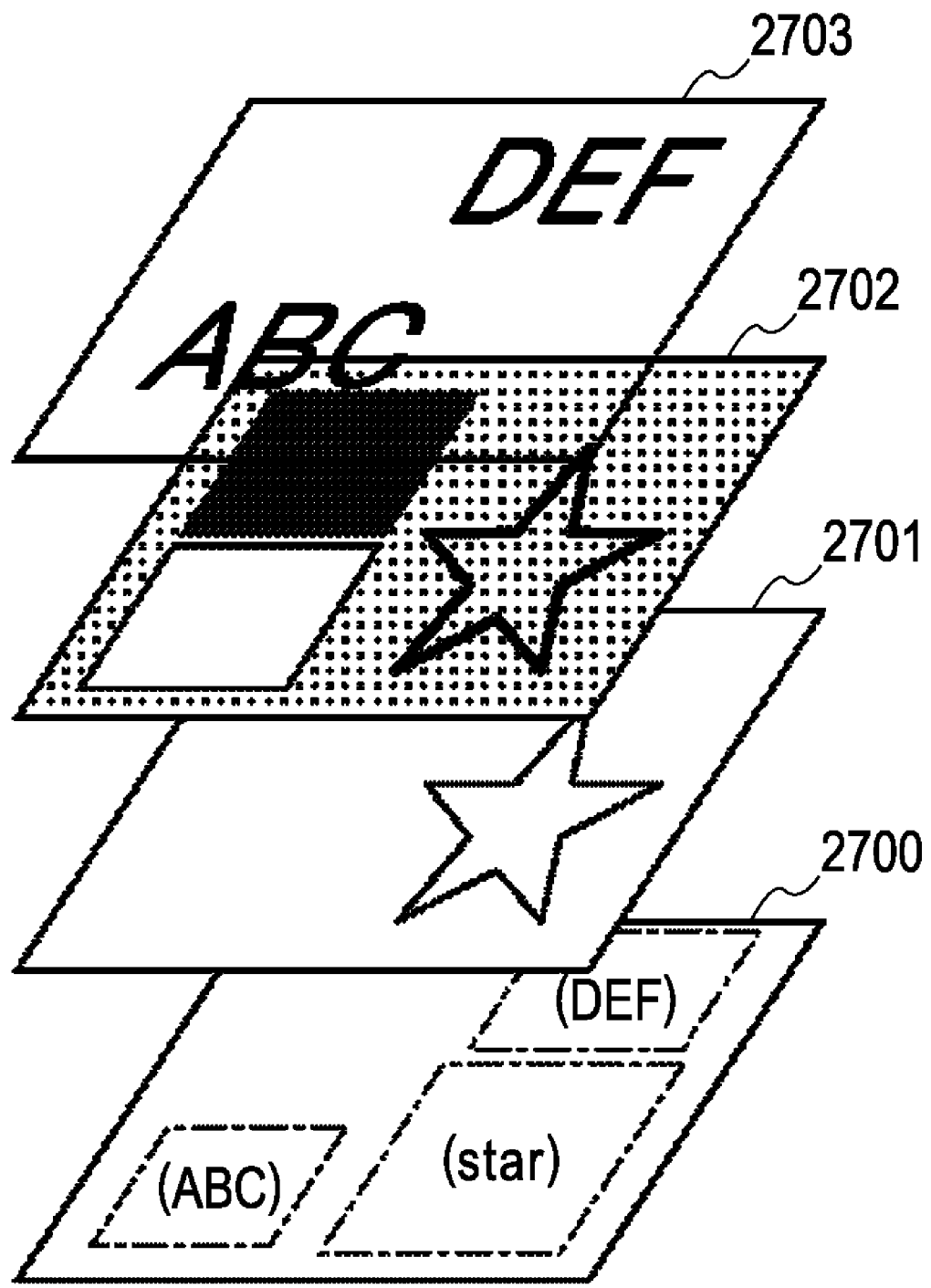
FIG. 27 is an illustration of an example of an output data configuration.

For the display purpose, the display program 121 executed by the personal computer 120 generates display image data in accordance with the graphic description shown in FIG. 26. FIG. 27 is a schematic illustration of rendering by the display program 121. First, the line-drawing graphic 2601 shown in FIG. 26 is rendered on a one-page-sized blank sheet of paper corresponding to the layer 2701. Next, the background image 2602 is rendered as the layer 2702 on the layer 2701. Finally, the character graphic 2603 is rendered as the top layer 2703. The layer 2702 is image data having a one-page size. Accordingly, in normal display, information on the layer 2701 and the lower layer is all hidden to be invisible. In addition, although, in FIG. 27, the information of the non-display meaning description 2600 is shown as the bottom layer 2700 for brevity of description, the information of this layer is not actually used for display.

FIG. 12 shows an example of a screen displayed by an application including the display program. As described above, the screen shows an image with the character vector information 2603 superimposed on the background-image information 2602.

For the reuse purpose, the reuse program 122 executed by the personal computer 120 generates reusable data on the basis of the graphic description shown in FIG. 26.

Figure 28:
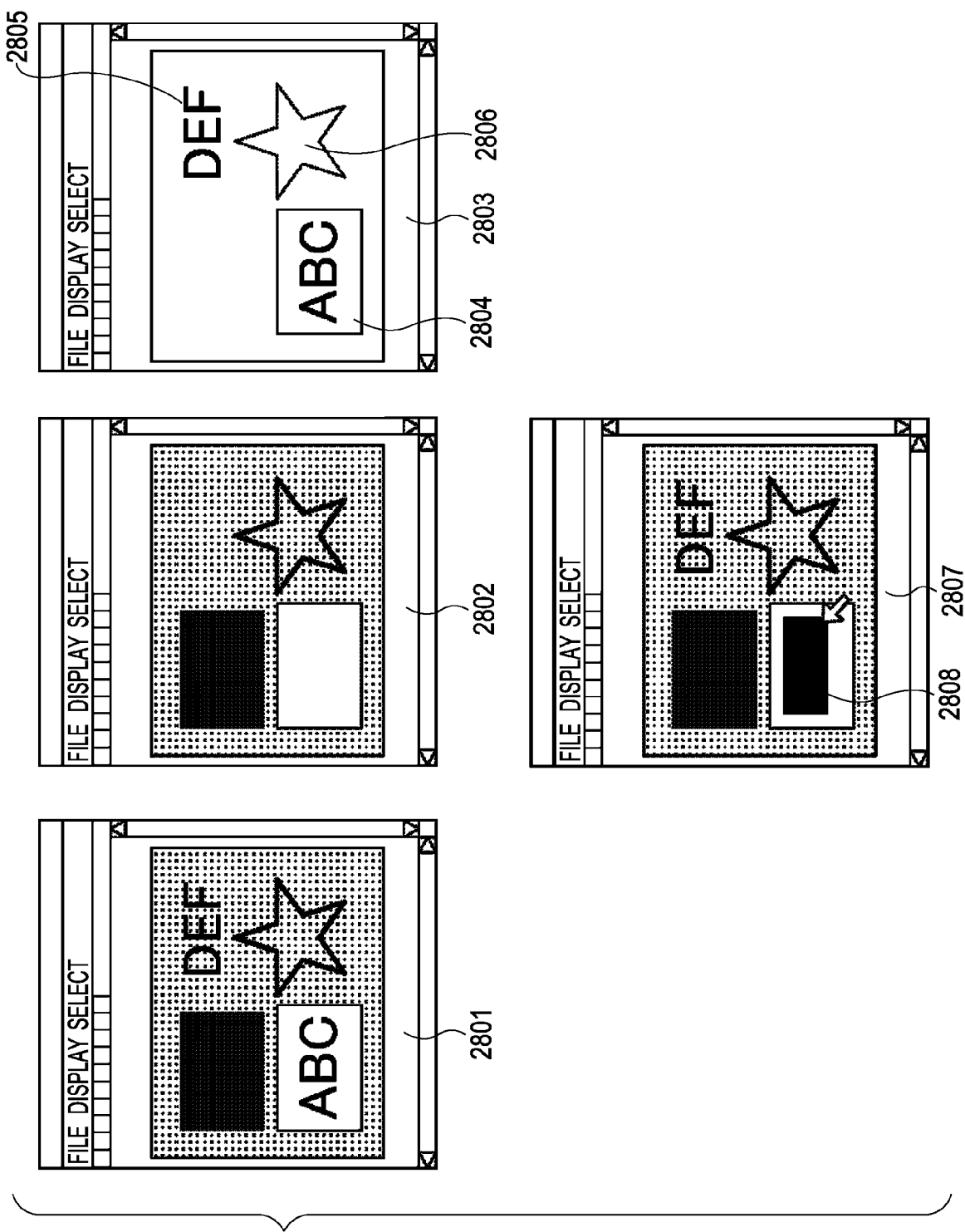
FIG. 28 is an illustration of reuse application screen examples in the third embodiment.

FIG. 28 shows examples of screens displayed by an application including the reuse program. This application has two types of modes, that is, a graphic-selection mode and a meaning-description selection mode. In the graphic-selection mode, electronic data including a graphic description is loaded to be displayed on the screen. In the graphic-selection mode, the application has a function in which, by operating a mouse or the like by the user to select all or part of the information, graphic data corresponding to the selected area is transferred and made reusable for editing or the like in a different application or the like. In the meaning-description selection mode, the application has a function in which, when electronic data including a character or shape code is loaded, on the basis of a user's instruction, code description information of a corresponding area on the screen is selected and reused by a different application such as a word processing editor.

A case in which the data shown in FIG. 26 is input as the electronic data 2430 is described below as an example.

In the graphic-selection mode, three types of screens can be switched for display on the basis of a user's instruction. The three types of screens consist of a screen 2801 generated by rendering, for the data in FIG. 26, pieces 2601, 2602, and 2603 of the graphic information in the order given one on top of the other, a screen 2802 on which only the background-image information represented by the compression code 2602 is rendered, and a screen 2803 on which only pieces of the information 2601 and 2603 are rendered excluding the background-image information. By specifying a character portion or a line-drawing portion on each displayed screen, corresponding graphic language data can be selected and transferred to a different application.

Next, on a screen 2807 in the meaning-description-selection mode, representations are seemingly shown as shown on the screen 2801. However, for an area specified by the user, instead of corresponding graphic description, character codes (data) of the meaning description information 2600 that correspond to the specified area are selected. The selected data can similarly be transferred to the different application.

For example, when, on the screen 2803 in the graphic-selection mode, a line-drawing portion 2806 is selected and transferred to the different application by the user, what is transferred is the line-drawing vector information in the description information 2601. This description is the graphic description generated in step S2509 in FIG. 25, the graphic description being in a state decomposed into line elements by thinning. Thus, editing, such as processing, is easily performed on this description. Conversely, due to an effect of the thinning, the appearance may not match that of the original data.

When the area is displayed by the display application described with reference to FIG. 12, as described above, the graphic description of the line-drawing vector information 2603 is concealed by the background-image information 2602, and image data of the line-drawing portion that remains on the background image is actually displayed. Therefore, for use in display, information close to the scanned input image is displayed as the line drawing portion.

When, on the screen in the meaning description-selection mode, a character portion 2808 is selected and transferred to a different application by the user, what is transferred is the character-code information in the description information in FIG. 26. The character-code information is easily used as characters by a text editor or the like since it is generated by character recognition in step S2506 in FIG. 25. However, if the character-code information is used for display, the appearance may not match that of characters represented by the character code information due to a difference in font and false recognition. Accordingly, the portion 2808 is drawn on the basis of the graphic description 2603 for vectorizing character outlines by the application described with reference to FIG. 12, the code-description information 2600 is not rendered, so that information close to the scanned input image is displayed.

The graphic description in FIG. 26 is only an example. Accordingly, a different graphic-description language having similar description specifications may be used. For example, even if a language, such as SVG or PDF, is used, similar advantages can be obtained.

As described above, according to the third embodiment, from an image of a scanned document, information generated by vectorizing a character portion and information generated by vectorizing a line-drawing portion are extracted, and, from the original image, an image on which a character portion of a foreground is filled with peripheral pixels is extracted as background image data. Furthermore, meaning information is extracted, the meaning information including character and shape codes obtained by recognizing the character portion and the line drawing. The above pieces of information are converted into electronic data including graphic-description information for rendering non-display meaning-description information, a non-display foreground line-drawing vector, a display background image, and a display foreground character vector in the order given.

The electronic data generated as described above is good for a graphic editing use and can be reused since the generated electronic data includes vector data generated by vectorizing the character and line-drawing portions. The generated electronic data can be reused as data representing meanings of characters and figures since the generated electronic data includes character and shape codes generated by recognizing the character and line-drawing portions. In addition, when the generated electronic data is used for display, image information that is equivalent to the original image is displayed. Thus, display quality is maintained. Furthermore, the meaning-description information portion in the electronic data includes a display graphic description by which the appearance matches a representation based on the graphic description.

In other words, according to an embodiment of the present invention, electronic data suitable for both display and reuse can be generated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-098003 filed Mar. 31, 2006, which is hereby incorporated by reference herein in its entirety.

What is claimed is:

1. An image-processing apparatus comprising:
a region-extracting unit configured to extract a plurality of regions from an input image;
an identifying unit configured to identify a first foreground image and a second foreground image on the basis of the regions extracted by the region-extracting unit;
a vectorization unit configured to convert the first foreground image and the second foreground image included in the input image into vector data; and
a generating unit configured to generate multi-layered electronic data including a first layer including vector data of the first foreground image in the input image, a second layer including a background image in the input image, and a third layer including vector data of the second foreground image in the input image.

2. The image-processing apparatus according to claim 1, wherein:
the vector data of the first foreground image is suitable for display; and
the vector data of the second foreground image is suitable for reuse.

3. The image-processing apparatus according to claim 1, wherein the background image is created so that a portion of the background image, corresponding to the portion of the input image occupied by the first foreground image whose vector data is included in the first layer, is filled with a color selected from a periphery around the portion of the input image.

4. The image-processing apparatus according to claim 1, wherein the identifying unit identifies, as the first foreground image, a character image in a character region extracted from the input image, and identifies, as the second foreground image, a line-drawing image in a line drawing region extracted from the input image.

5. An image-processing apparatus comprising:
a vectorization unit configured to convert foreground images included in an input image into vector data;
an identifying unit configured to identify, on the basis of an image reproduced from the vector data obtained by the vectorization unit and the input image, from which of a first foreground image and a second foreground image the vector data is generated; and
a generating unit configured to generate multi-layered electronic data including a first layer including vector data of the first foreground image in the input image, a second layer including a background image in the input image, and a third layer including vector data of the second foreground image in the input image.

6. The image-processing apparatus according to claim 5, wherein, by detecting a color on the input image concerning the image reproduced from the vector data, on the basis of the detected color, the identifying unit identifies from which of the first foreground image and the second foreground image the vector data is generated.

7. The image-processing apparatus according to claim 5, wherein, on the basis of a shape of the image reproduced from the vector data and a corresponding shape in the input image, the identifying unit identifies from which of the first foreground image and the second foreground image the vector data is generated.

8. An image-processing apparatus comprising:
a vectorization unit configured to convert foreground images included in an input image into vector data;
a character-recognition unit configured to perform character recognition on a character image included in the input image; and
a generating unit configured to generate multi-layered electronic data including a first layer including vector data of a first foreground image in the input image, a second layer including a background image in the input image, a third layer including vector data of a second foreground image in the input image and a fourth layer including a result of the character recognition performed by the character-recognition unit.

9. An image-processing apparatus comprising:
a vectorization unit configured to convert foreground images included in an input image into vector data;
a shape-recognition unit configured to perform shape recognition on a line-drawing image included in the input image; and
a generating unit configured to generate multi-layered electronic data including a first layer including vector data of a first foreground image in the input image, a second layer including a background image in the input image, a third layer including vector data of a second foreground image in the input image, and a fourth layer including a result of the shape recognition performed by the shape-recognition unit.

10. An image-processing apparatus,
a vectorization unit configured to convert foreground images included in an input image into vector data; and
a generating unit configured to generate multi-layered electronic data including a first layer including vector data of a first foreground image in the input image, a second layer including a background image in the input image, and a third layer including vector data of a second foreground image in the input image,
wherein, when the multi-layered electronic data generated by the generating unit is used for display, the image-processing apparatus performs display by superimposing an image reproduced from the vector data included in the first layer on the background image included in the second layer.

11. An image-processing apparatus comprising:
a vectorization unit configured to convert foreground images included in an input image into vector data; and
a generating unit configured to generate multi-layered electronic data including a first layer including vector data of a first foreground image in the input image, a second layer including a background image in the input image, and a third layer including vector data of a second foreground image in the input image,
wherein, when the multi-layered electronic data generated by the generating unit is used for display, display using the first layer and the second layer, display using the first layer and the third layer, and display using only the second layer are selectively switchable on the basis of a user's instruction.

12. An image-processing method comprising the steps of:
extracting a plurality of regions from an input image;
identifying a first foreground image and a second foreground image on the basis of the regions extracted in the region-extracting step;
converting the first foreground image and the second foreground image included in the input image into vector data; and
generating multi-layer electronic data including a first layer including vector data of the first foreground image in the input image, a second layer including a background image in the input image, and a third layer including vector data of the second foreground image in the input image.

13. The image-processing method according to claim 12, wherein:
the vector data of the first foreground image is suitable for display; and
the vector data of the second foreground image is suitable for reuse.

14. The image-processing method according to claim 12, wherein the background image in the input image is created such that a portion of the input image corresponding to the first foreground image whose vector data is included in the first layer is filled with a color selected from a periphery around the portion of the input image.

15. The image-processing method according to claim 12, wherein, in the step of identifying the first and second foreground images, a character image in a character region extracted from the input image is identified as the first foreground image, and a line-drawing image in a line drawing region extracted from the input image is identified as the second foreground image.

16. An image-processing method comprising the steps of:
converting foreground images included in an input image into vector data;
on the basis of an image reproduced from the vector data of the converting step and the input image, identifying from which of a first foreground image and a second foreground image the vector data is generated; and
generating multi-layer electronic data including a first layer including vector data of the first foreground image in the input image, a second layer including a background image in the input image, and a third layer including vector data of the second foreground image in the input image.

17. The image-processing method according to claim 16, wherein, by detecting a color on the input image concerning the image reproduced from the vector data, on the basis of the detected color, it is identified from which of the first foreground image and the second foreground image the vector data is generated.

18. The image-processing method according to claim 16, wherein, on the basis of a shape of the image reproduced from the vector data and a corresponding shape in the input image, it is identified from which of the first foreground image and the second foreground image the vector data is generated.

19. An image-processing method comprising the steps of:
converting foreground images included in an input image into vector data;
performing character recognition on a character image included in the input image; and
generating multi-layer electronic data including a first layer including vector data of a first foreground image in the input image, a second layer including a background image in the input image, a third layer including vector data of a second foreground image in the input image, and
a fourth layer including a result of the character recognition performed.

20. An image-processing method comprising the steps of:
converting foreground images included in an input image into vector data;
performing shape recognition on a line-drawing image included in the input image and
generating multi-layer electronic data including a first layer including vector data of a first foreground image in the input image, a second layer including a background image in the input image, a third layer including vector data of a second foreground image in the input image, and a fourth layer including a result of the shape recognition performed.

21. An image-processing method comprising:
converting foreground images included in an input image into vector data; and
generating multi-layer electronic data including a first layer including vector data of a first foreground image in the input image, a second layer including a background image in the input image, and a third layer including vector data of a second foreground image in the input image,
wherein, when the generated electronic data is used for display, display is performed by superimposing an image reproduced from the vector data included in the first layer on the background image included in the second layer.

22. An image-processing method comprising:
converting foreground images included in an input image into vector data; and
generating multi-layer electronic data including a first layer including vector data of a first foreground image in the input image, a second layer including a background image in the input image, and a third layer including vector data of a second foreground image in the input image,
wherein, when the generated electronic data is used for display, display using the first layer and the second layer, display using the first layer and the third layer, and display using only the second layer are selectively switched on the basis of a user's instruction.

23. A non-transitory computer-readable recording medium storing a computer program for allowing a computer to execute the steps of:
extracting a plurality of regions from an input image;
identifying a first foreground image and a second foreground image on the basis of the regions extracted in the region-extracting step;
converting the first foreground image and the second foreground image included in the input image into vector data; and
generating multi-layer electronic data including a first layer including vector data of the first foreground image in the input image, a second layer including a background image in the input image, and a third layer including vector data of the second foreground image in the input image.

24. The non-transitory computer-readable recording medium according to claim 23, wherein:
the vector data of the first foreground image is suitable for display; and
the vector data of the second foreground image is suitable for reuse.

25. The non-transitory computer-readable recording medium according to claim 23, wherein the background image in the input image is created such that a portion of the input image corresponding to the first foreground image whose vector data is included in the first layer is filled with a color selected from a periphery around the portion of the input image.

26. The non-transitory computer-readable recording medium according to claim 23, wherein, in the step of identifying the first and second foreground images, a character image in a character region extracted from the input image is identified as the first foreground image, and a line-drawing image in a line drawing region extracted from the input image is identified as the second foreground image.

27. A non-transitory computer-readable recording medium storing a computer program for allowing a computer to execute the steps of:
converting foreground images included in an input image into vector data;
on the basis of an image reproduced from the vector data of the converting step and the input image, identifying from which of a first foreground image and a second foreground image the vector data is generated; and
generating multi-layer electronic data including a first layer including vector data of the first foreground image in the input image, a second layer including a background image in the input image, and a third layer including vector data of the second foreground image in the input image.

28. The non-transitory computer-readable recording medium according to claim 27, wherein, by detecting a color on the input image concerning the image reproduced from the vector data, on the basis of the detected color, it is identified from which of the first foreground image and the second foreground image the vector data is generated.

29. The non-transitory computer-readable recording medium according to claim 27, wherein, on the basis of a shape of the image reproduced from the vector data and a corresponding shape in the input image, it is identified from which of the first foreground image and the second foreground image the vector data is generated.

30. A non-transitory computer-readable recording medium storing a computer program for allowing a computer to execute the steps of:
converting foreground images included in an input image into vector data;
performing character recognition on a character image included in the input image; and
generating multi-layer electronic data including a first layer including vector data of a first foreground image in the input image, a second layer including a background image in the input image, a third layer including vector data of a second foreground image in the input image, and a fourth layer including a result of the character recognition performed.

31. A non-transitory computer-readable recording medium storing a computer program for allowing a computer to execute the steps of:
converting foreground images included in an input image into vector data;
performing shape recognition on a line-drawing image included in the input image; and
generating multi-layer electronic data including a first layer including vector data of a first foreground image in the input image, a second layer including a background image in the input image, a third layer including vector data of a second foreground image in the input image, and a fourth layer including a result of the shape recognition performed.

32. A non-transitory computer-readable recording medium storing a computer program for allowing a computer to execute the steps of:
converting foreground images included in an input image into vector data; and
generating multi-layer electronic data including a first layer including vector data of a first foreground image in the input image, a second layer including a background image in the input image, and a third layer including vector data of a second foreground image in the input image,
wherein, when the generated electronic data is used for display, display is performed by superimposing an image reproduced from the vector data included in the first layer on the background image included in the second layer.

33. A non-transitory computer-readable recording medium storing a computer program for allowing a computer to execute the steps of:
converting foreground images included in an input image into vector data; and
generating multi-layer electronic data including a first layer including vector data of a first foreground image in the input image, a second layer including a background image in the input image, and a third layer including vector data of a second foreground image in the input image,
wherein, when the generated electronic data is used for display, display using the first layer and the second layer, display using the first layer and the third layer, and display using only the second layer are selectively switched on the basis of a user's instruction.

* * * * *